United States Patent
Rungta et al.

(10) Patent No.: US 11,888,623 B2
(45) Date of Patent: Jan. 30, 2024

(54) MULTIPLEXING OF HARQ AND CSI ON PUCCH

(71) Applicant: QUALCOMM Incorporated, San Diego, CA (US)

(72) Inventors: Pranay Sudeep Rungta, San Diego, CA (US); Yi Huang, San Diego, CA (US); Amir Aminzadeh Gohari, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/582,702

(22) Filed: Sep. 25, 2019

(65) Prior Publication Data

US 2020/0106564 A1    Apr. 2, 2020

Related U.S. Application Data

(60) Provisional application No. 62/737,646, filed on Sep. 27, 2018.

(51) Int. Cl.
*H04W 72/04* (2023.01)
*H04L 1/1812* (2023.01)
(Continued)

(52) U.S. Cl.
CPC .......... *H04L 1/1819* (2013.01); *H04L 1/0026* (2013.01); *H04L 5/0055* (2013.01); *H04W 72/1268* (2013.01); *H04W 72/21* (2023.01)

(58) Field of Classification Search
CPC ....... H04L 1/1864; H04L 1/1854; H04L 1/18; H04L 1/1896; H04L 1/1825;
(Continued)

(56) References Cited

U.S. PATENT DOCUMENTS

2008/0232449 A1* 9/2008 Khan ................ H04L 25/03343
375/220
2012/0087254 A1    4/2012 Yin et al.
(Continued)

FOREIGN PATENT DOCUMENTS

| EP | 3358897 A1 | 8/2018 |
|---|---|---|
| WO | WO-2017003878 A1 | 1/2017 |
| WO | WO-2017023146 A1 | 2/2017 |

OTHER PUBLICATIONS

International Search Report and Written Opinion—PCT/US2019/053071—ISA/EPO—dated Dec. 13, 2019.

*Primary Examiner* — Wutchung Chu
*Assistant Examiner* — Jason A Harley
(74) *Attorney, Agent, or Firm* — Patterson + Sheridan, L.L.P.

(57) ABSTRACT

Certain aspects of the present disclosure provide techniques for avoiding out of order uplink data reception upon data radio bearer (DRB) release or quality of service (QoS) flow addition. An exemplary method that may be performed by a user equipment (UE), includes receiving an indication from a base station (BS) that multiplexing of hybrid automatic retransmission request (HARQ) information and channel state information (CSI) is enabled in all physical uplink control channel (PUCCH) resources, generating a first CSI report regarding a first downlink (DL) channel from the BS, multiplexing a HARQ response to a transmission from the BS and the first CSI report in a PUCCH, and transmitting the PUCCH to the BS via one of the PUCCH resources.

16 Claims, 27 Drawing Sheets

(51) Int. Cl.
*H04L 1/20* (2006.01)
*H04W 72/542* (2023.01)
*H04W 76/15* (2018.01)
*H04W 88/02* (2009.01)
*H04W 72/0446* (2023.01)
*H04W 88/08* (2009.01)
*H04B 17/309* (2015.01)
*H04L 1/00* (2006.01)
*H04W 72/1268* (2023.01)
*H04L 5/00* (2006.01)
*H04W 72/21* (2023.01)

(58) Field of Classification Search
CPC ............... H04L 1/0005; H04L 1/1822; H04W 72/0413; H04W 74/004; H04W 72/1268; H04W 72/1284; H04B 7/0626
USPC ............................................. 370/535; 455/68
See application file for complete search history.

(56) References Cited

U.S. PATENT DOCUMENTS

| | | | |
|---|---|---|---|
| 2014/0036704 A1 | 2/2014 | Han et al. | |
| 2015/0173102 A1* | 6/2015 | Ruiz Delgado | H04L 5/14 370/280 |
| 2016/0183244 A1* | 6/2016 | Papasakellariou | H04L 5/0057 370/329 |
| 2016/0255649 A1* | 9/2016 | Kusashima | H04W 72/1289 370/280 |
| 2016/0277162 A1* | 9/2016 | Dinan | H04L 5/001 |
| 2017/0041923 A1* | 2/2017 | Park | H04L 5/0053 |
| 2018/0019853 A1* | 1/2018 | Aiba | H04L 1/1812 |
| 2019/0166598 A1* | 5/2019 | Papasakellariou | H04L 1/0031 |
| 2019/0239216 A1* | 8/2019 | Kundu | H04L 1/1671 |
| 2019/0261361 A1* | 8/2019 | Xiong | H04W 72/02 |
| 2019/0261391 A1* | 8/2019 | Kundu | H04W 72/0446 |
| 2021/0022129 A1* | 1/2021 | Yuan | H04L 5/0057 |

* cited by examiner

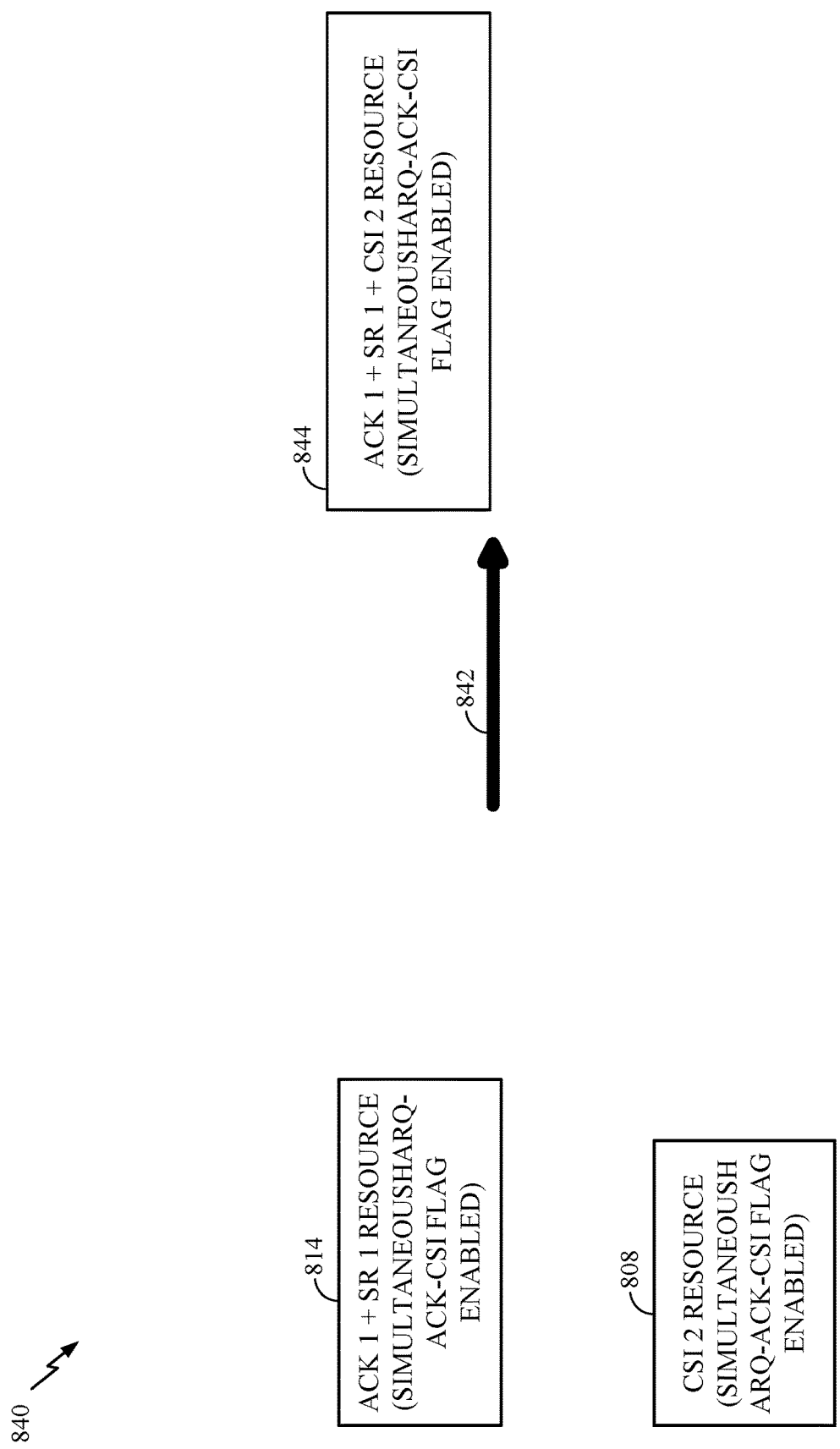

MULTIPLEXING OF HARQ AND CSI ON PUCCH

CROSS-REFERENCE TO RELATED APPLICATIONS

The present application for patent claims benefit of and priority to U.S. Provisional Patent Application Ser. No. 62/737,646, filed Sep. 27, 2018, which is assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for multiplexing hybrid automatic retransmission request (HARQ) responses and channel state information (CSI) reports in physical uplink control channels (PUCCHs) in wireless communications networks, such as $5^{th}$ Generation (5G) networks that are also referred to as new radio (NR) networks.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In aspects of the present disclosure, a method for wireless communications that may be performed by a user equipment (UE) is provided. The method generally includes receiving an indication from a base station (BS) that multiplexing of hybrid automatic retransmission request (HARQ) information and channel state information (CSI) is enabled in all physical uplink control channel (PUCCH) resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

In aspects of the present disclosure, a method for wireless communications that may be performed by a base station (BS) is provided. The method generally includes transmitting an indication to a user equipment (UE) that multiplexing of hybrid automatic retransmission request (HARQ) information and channel state information (CSI) is enabled in all physical uplink control channel (PUCCH) resources; receiving a PUCCH from the UE via one of the PUCCH resources, wherein the PUCCH includes a HARQ response to a transmission from the BS multiplexed with a first CSI report regarding a first downlink channel to the UE; and demultiplexing the first CSI report and the HARQ response from the PUCCH.

In aspects of the present disclosure, a method for wireless communications that may be performed by a user equipment (UE) is provided. The method generally includes receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource;

generating a first CSI report regarding a first downlink (DL) channel from the BS, wherein the first CSI report corresponds to a first PUCCH resource that corresponds to a first indication of the plurality of indications; obtaining a HARQ response to a transmission from the BS, wherein the HARQ response corresponds to a second PUCCH resource that corresponds to a second indication of the plurality of indications; determining, based on the first indication and the second indication to multiplex the HARQ response and the first CSI report in a PUCCH; multiplexing the HARQ response and the first CSI report in the PUCCH; and transmitting the PUCCH to the BS via a third PUCCH resource that corresponds to the PUCCH.

In aspects of the present disclosure, a method for wireless communications that may be performed by a base station (BS) is provided. The method generally includes transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources, wherein the PUCCH includes a HARQ response to a transmission from the BS multiplexed with a first CSI report regarding a first downlink channel to the UE, wherein: the first CSI report corresponds to a second PUCCH resource that corresponds to a first indication of the plurality of indications, and the HARQ response corresponds to a third PUCCH resource that corresponds to a second indication of the plurality of indications; determining, based on the first indication and the second indication, that the PUCCH includes the HARQ response multiplexed with the first CSI report; and demultiplexing the first CSI report and the HARQ response from the PUCCH.

In aspects of the present disclosure, a method for wireless communications that may be performed by a user equipment (UE) is provided. The method generally includes receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; generating a first CSI report regarding a first downlink (DL) channel from the BS; obtaining a HARQ response to a transmission from the BS; multiplexing the HARQ response and the first CSI report in a PUCCH, wherein the PUCCH corresponds to a first PUCCH resource that corresponds to a first indication of the plurality of indications; determining based on the first indication to multiplex the HARQ response and the first CSI report in the PUCCH; and transmitting the PUCCH to the BS via a first PUCCH resource.

In aspects of the present disclosure, a method for wireless communications that may be performed by a base station (BS) is provided. The method generally includes transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources corresponding to a first indication of the plurality of indications, wherein the PUCCH includes a HARQ response to a transmission from the BS multiplexed with a first CSI report regarding a first downlink channel to the UE; determining, based on the first indication, that the PUCCH includes the HARQ response multiplexed with the first CSI report; and demultiplexing the first CSI report and the HARQ response from the PUCCH.

In aspects of the present disclosure, a method for wireless communications that may be performed by a user equipment (UE) is provided. The method generally includes receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in all of the PUCCH resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

In aspects of the present disclosure, a method for wireless communications that may be performed by a base station (BS) is provided. The method generally includes transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receiving a PUCCH from the UE via a first PUCCH resource of the PUCCH resources, wherein the PUCCH includes a HARQ response to a transmission from the BS multiplexed with a first CSI report regarding a first downlink (DL) channel to the UE; determining, based on a first indication of the plurality of indications, that multiplexing of HARQ information and CSI is enabled in all of the PUCCH resources, wherein the first indication does not correspond to the first PUCCH resource; and demultiplexing the first CSI report and the HARQ response from the PUCCH.

In aspects of the present disclosure, a method for wireless communications that may be performed by a user equipment (UE) is provided. The method generally includes receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; generating a first CSI report regarding a first downlink (DL) channel from the BS; multiplexing a HARQ response to a transmission from the BS and the first CSI report in a PUCCH; and transmitting the PUCCH to the BS via one of the PUCCH resources having a larger payload size than the first PUCCH resource.

In aspects of the present disclosure, a method for wireless communications that may be performed by a base station (BS) is provided. The method generally includes transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; receiving a PUCCH from the UE via a second PUCCH resource having a larger payload size than the first PUCCH resource, wherein the PUCCH includes a HARQ response to a transmission from the BS multiplexed with a first CSI report regarding a first downlink (DL) channel to the UE; and demultiplexing the first CSI report and the HARQ response from the PUCCH.

In aspects of the present disclosure, an apparatus for wireless communications is provided. The apparatus generally includes a processor configured to: receive an indication from a base station (BS) that multiplexing of hybrid automatic retransmission request (HARQ) information and channel state information (CSI) is enabled in all physical uplink control channel (PUCCH) resources; generate a first CSI report regarding a first downlink (DL) channel from the BS; multiplex a HARQ response to a transmission from the BS and the first CSI report in a PUCCH; and transmit the PUCCH to the BS via one of the PUCCH resources; and a memory coupled with the processor.

In aspects of the present disclosure, an apparatus for wireless communications is provided. The apparatus generally includes a processor configured to: transmit an indication to a user equipment (UE) that multiplexing of hybrid automatic retransmission request (HARQ) information and channel state information (CSI) is enabled in all physical uplink control channel (PUCCH) resources; receive a PUCCH from the UE via one of the PUCCH resources, wherein the PUCCH includes a HARQ response to a transmission from the apparatus multiplexed with a first CSI report regarding a first downlink channel to the UE; and demultiplex the first CSI report and the HARQ response from the PUCCH; and a memory coupled with the processor.

In aspects of the present disclosure, an apparatus for wireless communications is provided. The apparatus generally includes a processor configured to: receive, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; generate a first CSI report regarding a first downlink (DL) channel from the BS, wherein the first CSI report corresponds to a first PUCCH resource that corresponds to a first indication of the plurality of indications; obtain a HARQ response to a transmission from the BS, wherein the HARQ response corresponds to a second PUCCH resource that corresponds to a second indication of the plurality of indications; determine, based on the first indication and the second indication to multiplex the HARQ response and the first CSI report in a PUCCH; multiplexing the HARQ response and the first CSI report in the PUCCH; and transmit the PUCCH to the BS via a third PUCCH resource that corresponds to the PUCCH; and a memory coupled with the processor.

In aspects of the present disclosure, an apparatus for wireless communications is provided. The apparatus generally includes a processor configured to: transmit, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receive a PUCCH from the UE via a first resource of the PUCCH resources, wherein the PUCCH includes a HARQ response to a transmission from the apparatus multiplexed with a first CSI report regarding a first downlink channel to the UE, wherein: the first CSI report corresponds to a second PUCCH resource that corresponds to a first indication of the plurality of indications, and the HARQ response corresponds to a third PUCCH resource that corresponds to a second indication of the plurality of indications; determine, based on the first indication and the second indication, that the PUCCH includes the HARQ response multiplexed with the first CSI report; and demultiplex the first CSI report and the HARQ response from the PUCCH; and a memory coupled with the processor.

In aspects of the present disclosure, an apparatus for wireless communications is provided. The apparatus generally includes a processor configured to: receive, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; generate a first CSI report regarding a first downlink (DL) channel from the BS; obtain a HARQ response to a transmission from the BS; multiplex the HARQ response and the first CSI report in a PUCCH, wherein the PUCCH corresponds to a first PUCCH resource that corresponds to a first indication of the plurality of indications; determine based on the first indication to multiplex the HARQ response and the first CSI report in the PUCCH; and transmit the PUCCH to the BS via a first PUCCH resource; and a memory coupled with the processor.

In aspects of the present disclosure, an apparatus for wireless communications is provided. The apparatus generally includes a processor configured to: transmit, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receive a PUCCH from the UE via a first resource of the PUCCH resources corresponding to a first indication of the plurality of indications, wherein the PUCCH includes a HARQ response to a transmission from the apparatus multiplexed with a first CSI report regarding a first downlink channel to the UE; determine, based on the first indication, that the PUCCH includes the HARQ response multiplexed with the first CSI report; and demultiplex the first CSI report and the HARQ response from the PUCCH; and a memory coupled with the processor.

In aspects of the present disclosure, an apparatus for wireless communications is provided. The apparatus generally includes a processor configured to: receive, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determine, based on a first indication of the plurality of indications, that multiplexing of HARQ information and CSI is enabled in all of the PUCCH resources; generate a first CSI report regarding a first downlink (DL) channel from the BS; multiplex a HARQ response to a transmission from the BS and the first CSI report in a PUCCH; and transmit the PUCCH to the BS via one of the PUCCH resources; and a memory coupled with the processor.

In aspects of the present disclosure, an apparatus for wireless communications is provided. The apparatus generally includes a processor configured to: transmit, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receive a PUCCH from the UE via a first PUCCH resource of the PUCCH resources, wherein the PUCCH includes a HARQ response to a transmission from the apparatus multiplexed with a first CSI report regarding a first downlink (DL) channel to the UE; determine, based on a first indication of the plurality of indications, that multiplexing of HARQ information and CSI is enabled in all of the PUCCH resources, wherein the first indication does not correspond to the first PUCCH resource; and demultiplex the first CSI report and the HARQ response from the PUCCH; and a memory coupled with the processor.

In aspects of the present disclosure, an apparatus for wireless communications is provided. The apparatus generally includes a processor configured to: receive, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determine, based on a first indication of the plurality of indications, that multiplexing of HARQ information and CSI is enabled in a first PUCCH resource and all PUCCH resources having a larger payload size than the first PUCCH resource; generate a first CSI report regarding a first downlink (DL) channel from the BS; multiplex a HARQ response to a transmission from the BS and the first CSI report in a PUCCH; and transmit the PUCCH to the BS via one of the PUCCH resources having a larger payload size than the first PUCCH resource; and a memory coupled with the processor.

In aspects of the present disclosure, an apparatus for wireless communications is provided. The apparatus generally includes a processor configured to: transmit, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; determine, based on a first indication of the plurality of indications, that multiplexing of HARQ information and CSI is enabled in a first PUCCH resource and all PUCCH resources having a larger payload size than the first PUCCH resource; receive a PUCCH from the UE via a second PUCCH resource having a larger payload size than the first PUCCH resource, wherein the PUCCH includes a HARQ response to a transmission from the apparatus multiplexed with a first CSI report regarding a first downlink (DL) channel to the UE; and demultiplex the first CSI report and the HARQ response from the PUCCH; and a memory coupled with the processor.

In aspects of the present disclosure, an apparatus for wireless communications is provided. The apparatus generally includes means for receiving an indication from a base station (BS) that multiplexing of hybrid automatic retransmission request (HARQ) information and channel state information (CSI) is enabled in all physical uplink control channel (PUCCH) resources; means for generating a first CSI report regarding a first downlink (DL) channel from the BS; means for multiplexing a HARQ response to a transmission from the BS and the first CSI report in a PUCCH; and means for transmitting the PUCCH to the BS via one of the PUCCH resources.

In aspects of the present disclosure, an apparatus for wireless communications is provided. The apparatus generally includes means for transmitting an indication to a user equipment (UE) that multiplexing of hybrid automatic retransmission request (HARQ) information and channel state information (CSI) is enabled in all physical uplink control channel (PUCCH) resources; means for receiving a PUCCH from the UE via one of the PUCCH resources, wherein the PUCCH includes a HARQ response to a transmission from the apparatus multiplexed with a first CSI report regarding a first downlink channel to the UE; and means for demultiplexing the first CSI report and the HARQ response from the PUCCH.

In aspects of the present disclosure, an apparatus for wireless communications is provided. The apparatus generally includes means for receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; means for generating a first CSI report regarding a first downlink (DL) channel from the BS, wherein the first CSI report corresponds to a first PUCCH resource that corresponds to a first indication of the plurality of indications; obtaining a HARQ response to a transmission from the BS, wherein the HARQ response corresponds to a second PUCCH resource that corresponds to a second indication of the plurality of indications; means for determining, based on the first indication and the second indication to multiplex the HARQ response and the first CSI report in a PUCCH; means for multiplexing the HARQ response and the first CSI report in the PUCCH; and means for transmitting the PUCCH to the BS via a third PUCCH resource that corresponds to the PUCCH.

In aspects of the present disclosure, an apparatus for wireless communications is provided. The apparatus generally includes means for transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; means for receiving a PUCCH from the UE via a first resource of the PUCCH resources, wherein the PUCCH includes a HARQ response to a transmission from the apparatus multiplexed with a first CSI report regarding a first downlink channel to the UE, wherein: the first CSI report corresponds to a second PUCCH resource that corresponds to a first indication of the plurality of indications, and the HARQ response corresponds to a third PUCCH resource that corresponds to a second indication of the plurality of indications; means for determining, based on the first indication and the second indication, that the PUCCH includes the HARQ response multiplexed with the first CSI report; and means for demultiplexing the first CSI report and the HARQ response from the PUCCH.

In aspects of the present disclosure, an apparatus for wireless communications is provided. The apparatus generally includes means for receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; means for generating a first CSI report regarding a first downlink (DL) channel from the BS; means for obtaining a HARQ response to a transmission from the BS; multiplexing the HARQ response and the first CSI report in a PUCCH, wherein the PUCCH corresponds to a first PUCCH resource that corresponds to a first indication of the plurality of indications; means for determining based on the first indication to multiplex the HARQ response and the first CSI report in the PUCCH; and means for transmitting the PUCCH to the BS via a first PUCCH resource.

In aspects of the present disclosure, an apparatus for wireless communications is provided. The apparatus generally includes means for transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; means for receiving a PUCCH from the UE via a first resource of the PUCCH resources corresponding to a first indication of the plurality of indications, wherein the PUCCH includes a HARQ response to a transmission from the BS multiplexed with a first CSI report regarding a first downlink channel to the UE; means for determining, based on the first indication, that the PUCCH includes the HARQ response multiplexed with the first CSI report; and means for demultiplexing the first CSI report and the HARQ response from the PUCCH.

In aspects of the present disclosure, an apparatus for wireless communications is provided. The apparatus generally includes means for receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; means for determining, based on a first indication of the plurality of indications, that multiplexing of HARQ information and CSI is enabled in all of the PUCCH resources; means for generating a first CSI report regarding a first downlink (DL) channel from the BS; means for multiplexing a HARQ response to a transmission from the BS and the first CSI report in a PUCCH; and means for transmitting the PUCCH to the BS via one of the PUCCH resources.

In aspects of the present disclosure, an apparatus for wireless communications is provided. The apparatus generally includes means for transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; means for receiving a PUCCH from the UE via a first PUCCH resource of the PUCCH resources, wherein the PUCCH includes a HARQ response to a transmission from the apparatus multiplexed with a first CSI report regarding a first downlink (DL) channel to the UE; means for determining, based on a first indication of the plurality of indications, that multiplexing of HARQ information and CSI is enabled in all of the PUCCH resources, wherein the first indication does not correspond to the first PUCCH resource; and means for demultiplexing the first CSI report and the HARQ response from the PUCCH.

In aspects of the present disclosure, an apparatus for wireless communications is provided. The apparatus generally includes means for receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; means for determining, based on a first indication of the plurality of indications, that multiplexing of HARQ information and CSI is enabled in a first PUCCH resource and all PUCCH resources having a larger payload size than the first PUCCH resource; means for generating a first CSI report regarding a first downlink (DL) channel from the BS; means for multiplexing a HARQ response to a transmission from the BS and the first CSI report in a PUCCH; and means for transmitting the PUCCH to the BS via one of the PUCCH resources having a larger payload size than the first PUCCH resource.

In aspects of the present disclosure, an apparatus for wireless communications is provided. The apparatus generally includes means for transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; means for determining, based on a first indication of the plurality of indications, that multiplexing of HARQ information and CSI is enabled in a first PUCCH resource and all PUCCH resources having a larger payload size than the first PUCCH resource; means for receiving a PUCCH from the UE via a second PUCCH resource having a larger payload size than the first PUCCH resource, wherein the PUCCH includes a HARQ response to a transmission from the apparatus multiplexed with a first CSI report regarding a first downlink (DL) channel to the UE; and means for demultiplexing the first CSI report and the HARQ response from the PUCCH.

In aspects of the present disclosure, a computer-readable medium for wireless communications is provided. The computer-readable medium includes instructions that, when executed by a processing system of a user equipment (UE), cause the processing system to perform operations generally including receiving an indication from a base station (BS) that multiplexing of hybrid automatic retransmission request (HARQ) information and channel state information (CSI) is enabled in all physical uplink control channel (PUCCH) resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

In aspects of the present disclosure, a computer-readable medium for wireless communications is provided. The computer-readable medium includes instructions that, when executed by a processing system of a base station (BS), cause the processing system to perform operations generally including transmitting an indication to a user equipment (UE) that multiplexing of hybrid automatic retransmission request (HARQ) information and channel state information (CSI) is enabled in all physical uplink control channel (PUCCH) resources; receiving a PUCCH from the UE via one of the PUCCH resources, wherein the PUCCH includes a HARQ response to a transmission from the BS multiplexed with a first CSI report regarding a first downlink channel to the UE; and demultiplexing the first CSI report and the HARQ response from the PUCCH.

In aspects of the present disclosure, a computer-readable medium for wireless communications is provided. The computer-readable medium includes instructions that, when executed by a processing system of a user equipment (UE), cause the processing system to perform operations generally including receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; generating a first CSI report regarding a first downlink (DL) channel from the BS, wherein the first CSI report corresponds to a first PUCCH resource that corresponds to a first indication of the plurality of indications; obtaining a HARQ response to a transmission from the BS, wherein the HARQ response corresponds to a second PUCCH resource that corresponds to a second indication of the plurality of indications; determining, based on the first indication and the second indication to multiplex the HARQ response and the first CSI report in a PUCCH; multiplexing the HARQ response and the first CSI report in the PUCCH; and transmitting the PUCCH to the BS via a third PUCCH resource that corresponds to the PUCCH.

In aspects of the present disclosure, a computer-readable medium for wireless communications is provided. The computer-readable medium includes instructions that, when executed by a processing system of a base station (BS), cause the processing system to perform operations generally including transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources, wherein the PUCCH includes a HARQ response to a transmission from the BS multiplexed with a first CSI report regarding a first downlink channel to the UE, wherein: the first CSI report corresponds to a second PUCCH resource that corresponds to a first indication of the plurality of indications, and the HARQ response corresponds to a third PUCCH resource that corresponds to a second indication of the plurality of indications; determining, based on the first indication and the second indication, that the PUCCH includes the HARQ response multiplexed with the first CSI report; and demultiplexing the first CSI report and the HARQ response from the PUCCH.

In aspects of the present disclosure, a computer-readable medium for wireless communications is provided. The computer-readable medium includes instructions that, when executed by a processing system of a user equipment (UE), cause the processing system to perform operations generally including receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource; generating a first CSI report regarding a first downlink (DL) channel from the BS; obtaining a HARQ response to a transmission from the BS; multiplexing the HARQ response and the first CSI report in a PUCCH, wherein the PUCCH corresponds to a first PUCCH resource that corresponds to a first indication of the plurality of indications; determining based on the first indication to multiplex the HARQ response and the first CSI report in the PUCCH; and transmitting the PUCCH to the BS via a first PUCCH resource.

In aspects of the present disclosure, a computer-readable medium for wireless communications is provided. The computer-readable medium includes instructions that, when executed by a processing system of a base station (BS), cause the processing system to perform operations generally including transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources corresponding to a first indication of the plurality of indications, wherein the PUCCH includes a HARQ response to a transmission from the BS multiplexed with a first CSI report regarding a first downlink channel to the UE; determining, based on the first indication, that the PUCCH includes the HARQ response multiplexed with the first CSI report; and demultiplexing the first CSI report and the HARQ response from the PUCCH.

In aspects of the present disclosure, a computer-readable medium for wireless communications is provided. The computer-readable medium includes instructions that, when executed by a processing system of a user equipment (UE), cause the processing system to perform operations generally including receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in all of the PUCCH resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

In aspects of the present disclosure, a computer-readable medium for wireless communications is provided. The computer-readable medium includes instructions that, when executed by a processing system of a base station (BS), cause the processing system to perform operations generally including transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receiving a PUCCH from the UE via a first PUCCH resource of the PUCCH resources, wherein the PUCCH includes a HARQ response to a transmission from the BS multiplexed with a first CSI report regarding a first downlink (DL) channel to the UE; determining, based on a first indication of the plurality of indications, that multiplexing of HARQ information and CSI is enabled in all of the PUCCH resources, wherein the first indication does not correspond to the first PUCCH resource; and demultiplexing the first CSI report and the HARQ response from the PUCCH.

In aspects of the present disclosure, a computer-readable medium for wireless communications is provided. The computer-readable medium includes instructions that, when executed by a processing system of a user equipment (UE), cause the processing system to perform operations generally including receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; generating a first CSI report regarding a first downlink (DL) channel from the BS; multiplexing a HARQ response to a transmission from the BS and the first CSI report in a PUCCH; and transmitting the PUCCH to the BS via one of the PUCCH resources having a larger payload size than the first PUCCH resource.

In aspects of the present disclosure, a computer-readable medium for wireless communications is provided. The computer-readable medium includes instructions that, when executed by a processing system of a base station (BS), cause the processing system to perform operations generally including transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; receiving a PUCCH from the UE via a second PUCCH resource having a larger payload size than the first PUCCH resource, wherein the PUCCH includes a HARQ response to a transmission from the BS multiplexed with a first CSI report regarding a first downlink (DL) channel to the UE; and demultiplexing the first CSI report and the HARQ response from the PUCCH.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 8A-8C are time-frequency resource diagrams illustrating a situation in which there is an intermediate PUCCH resource chosen that does not allow for HARQ response and CSI multiplexing, but the final determined PUCCH resource allows for HARQ responses and CSI to be multiplexed, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
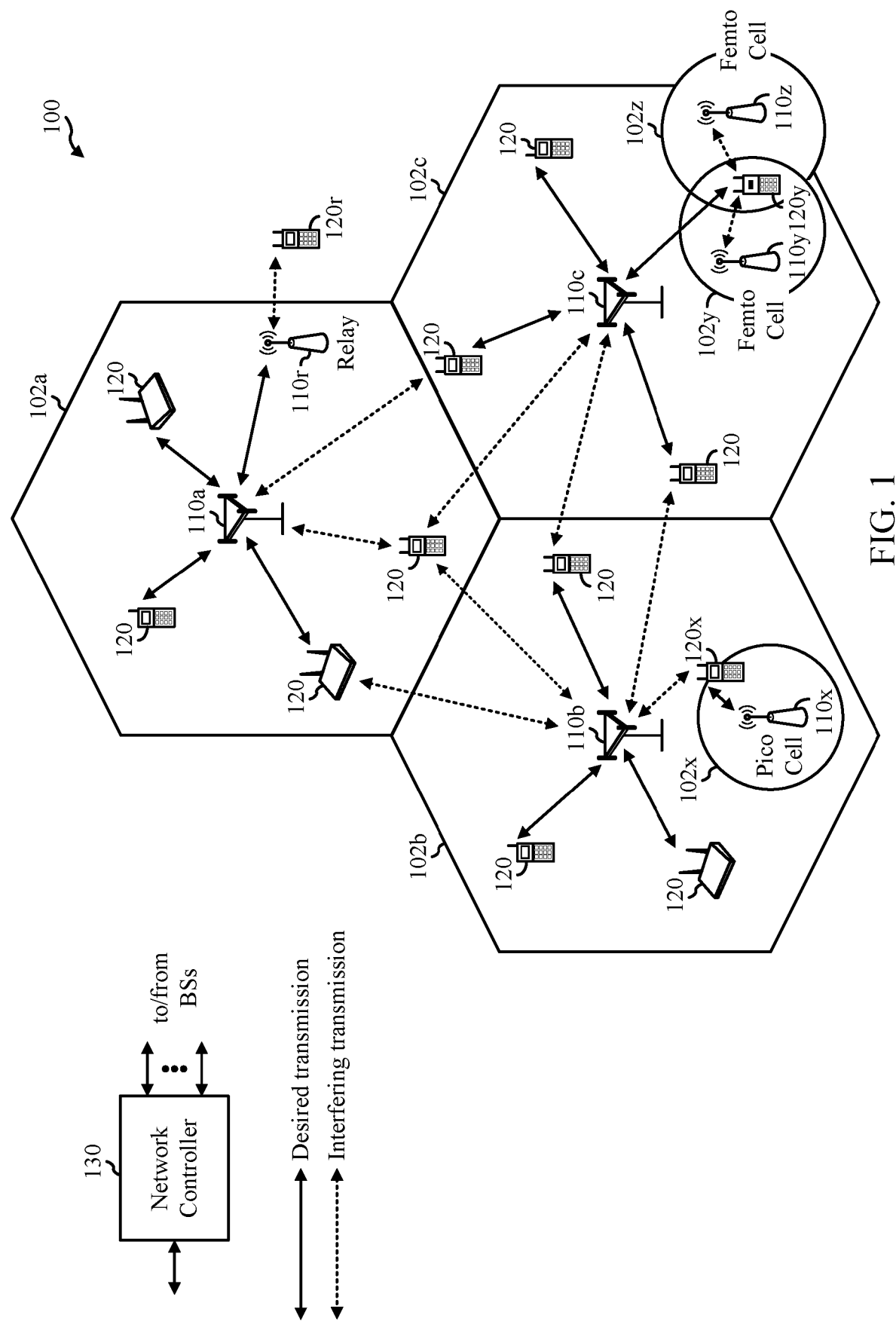
FIG. 1 is a block diagram conceptually illustrating an example telecommunications system, in accordance with certain aspects of the present disclosure.

Aspects of the present disclosure provide apparatus, methods, processing systems, and computer readable mediums for multiplexing hybrid automatic retransmission request (HARD) responses and channel state information (CSI) reports in physical uplink control channels (PUCCHs) in wireless communications networks, such as $5^{th}$ Generation (5G) networks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or wider) communications, millimeter wave (mmW) targeting high carrier frequency (e.g., 25 GHz or higher) communications, massive machine type communications (mMTC) targeting non-backward compatible machine type communications (MTC) techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. The systems and methods for avoiding out of order uplink data transmission upon data radio bearer (DRB) release or quality of service (QoS) flow addition in wireless communications networks described with respect to FIGS. 11, 12, and 13, below, may be implemented within wireless communication network 100.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to eight transmit antennas with multi-layer DL transmissions up to eight streams and up to two streams per UE. Multi-layer transmissions with up to two streams per UE may be supported. Aggregation of multiple cells may be supported with up to eight serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
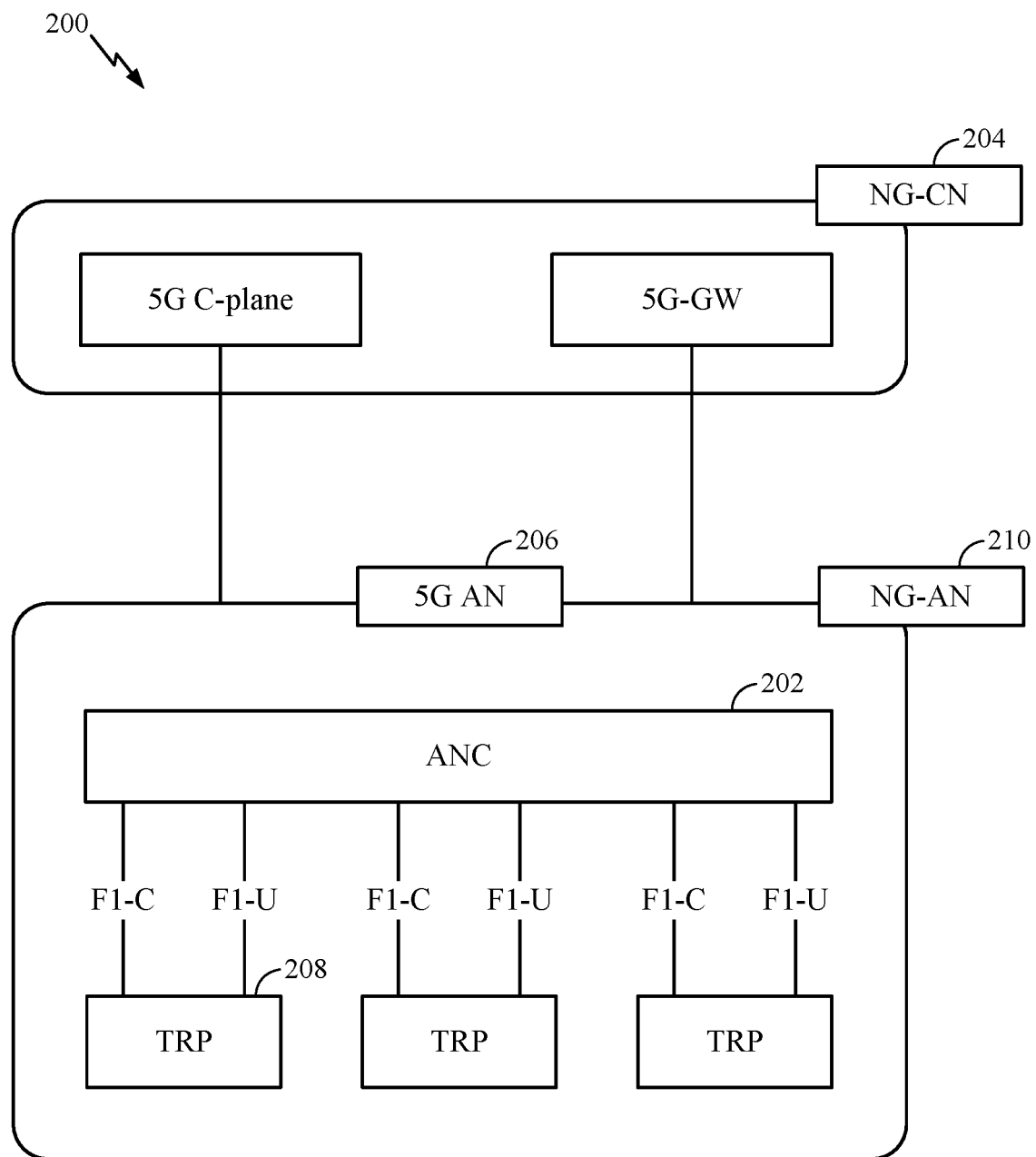
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
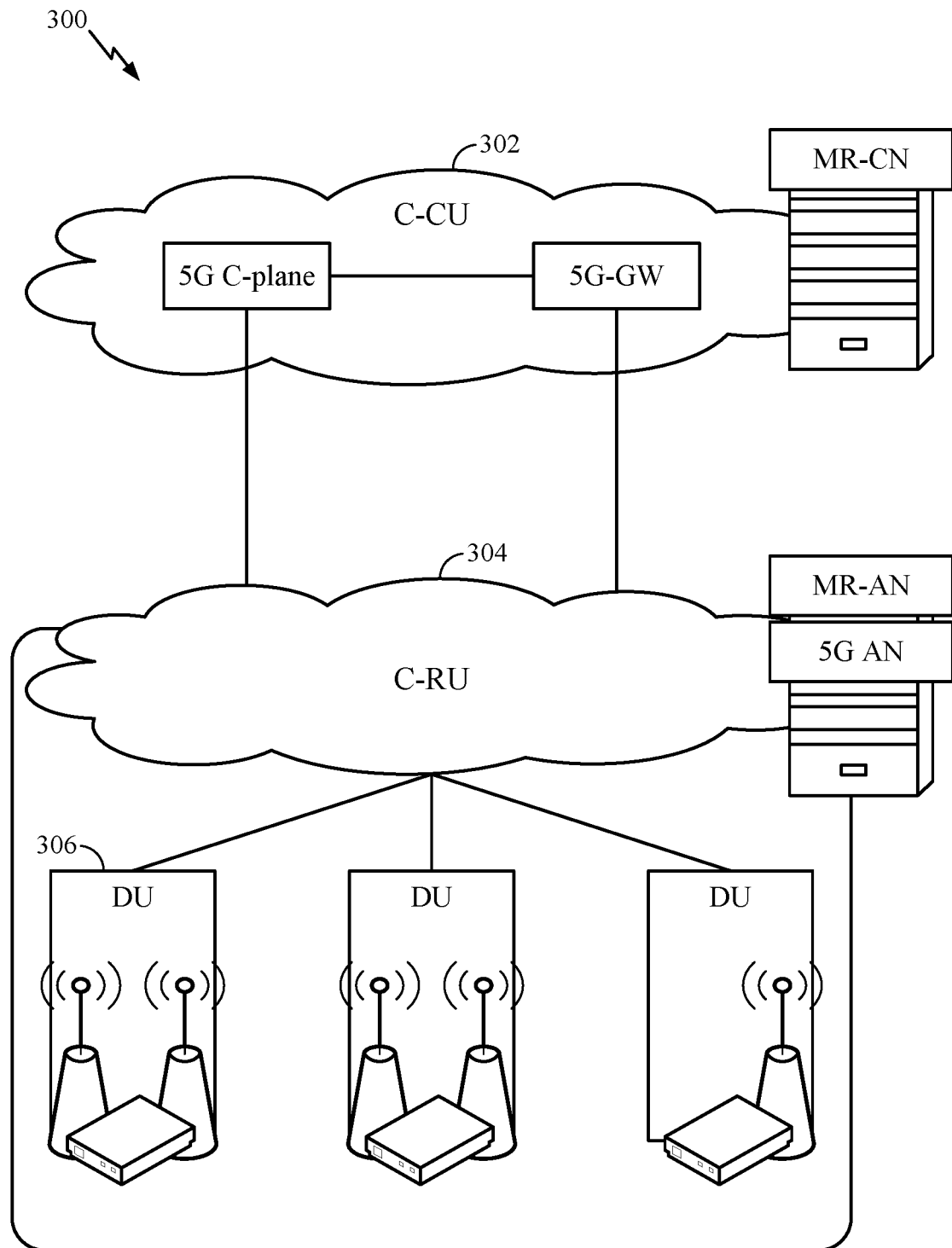
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
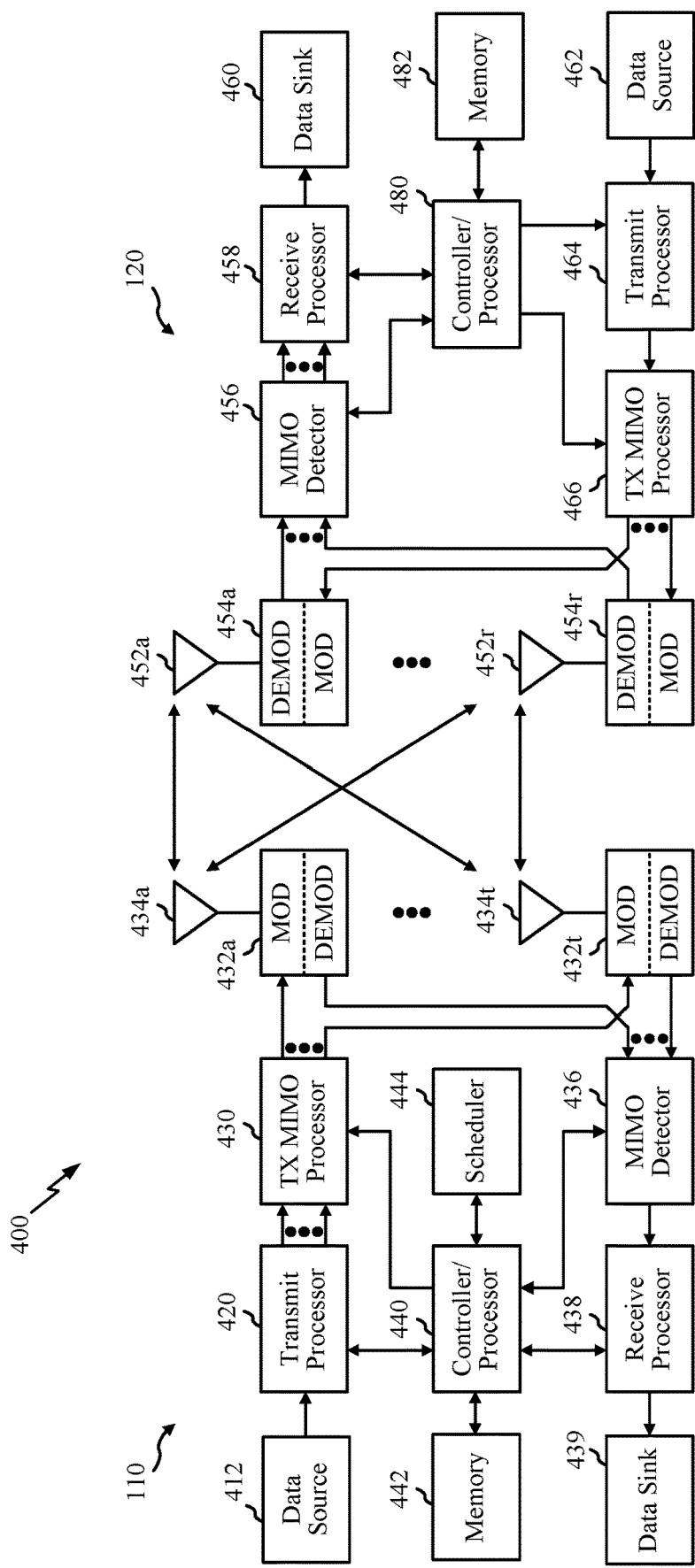
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as those described with respect to FIGS. 11, 12, and 13.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
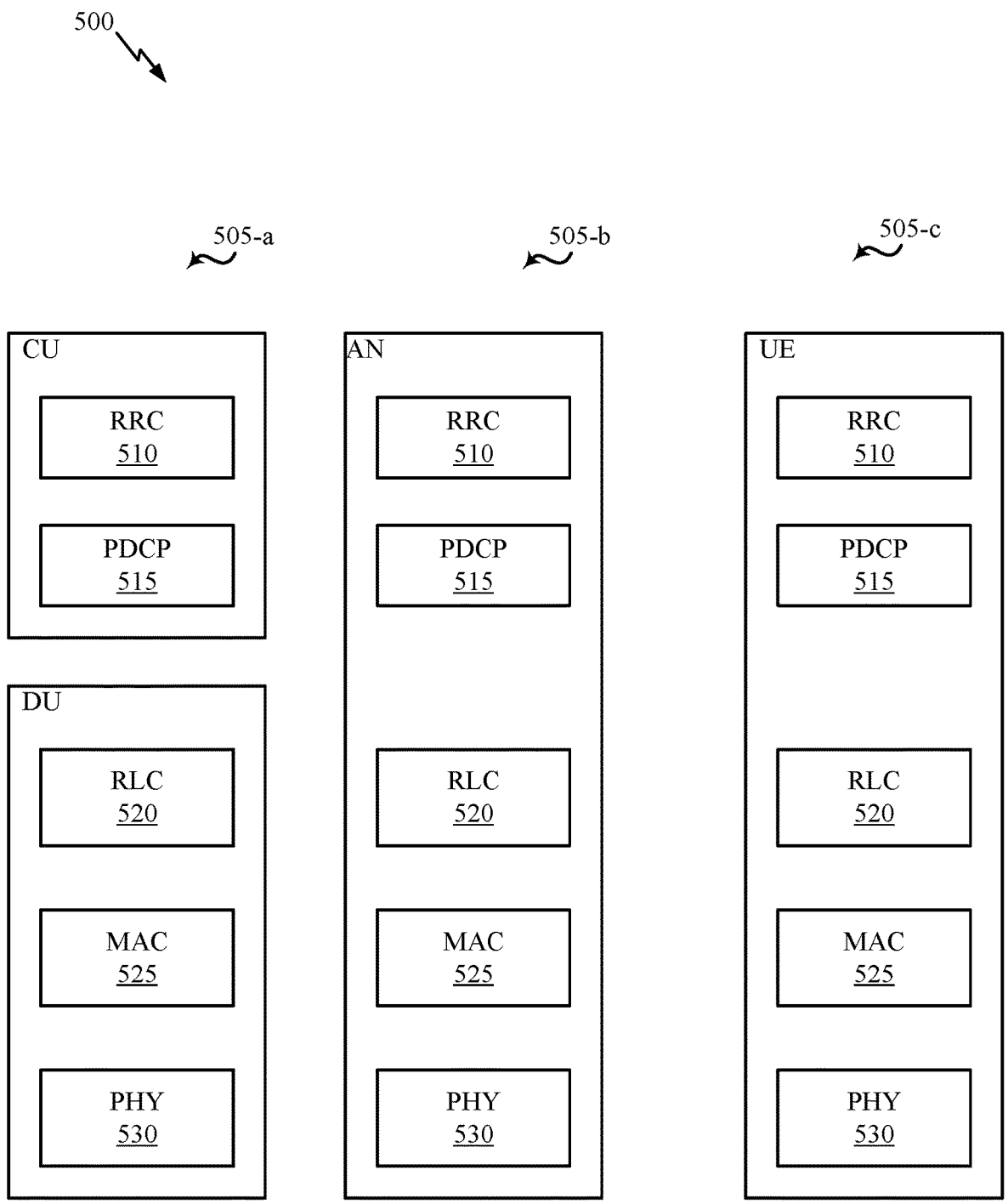
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
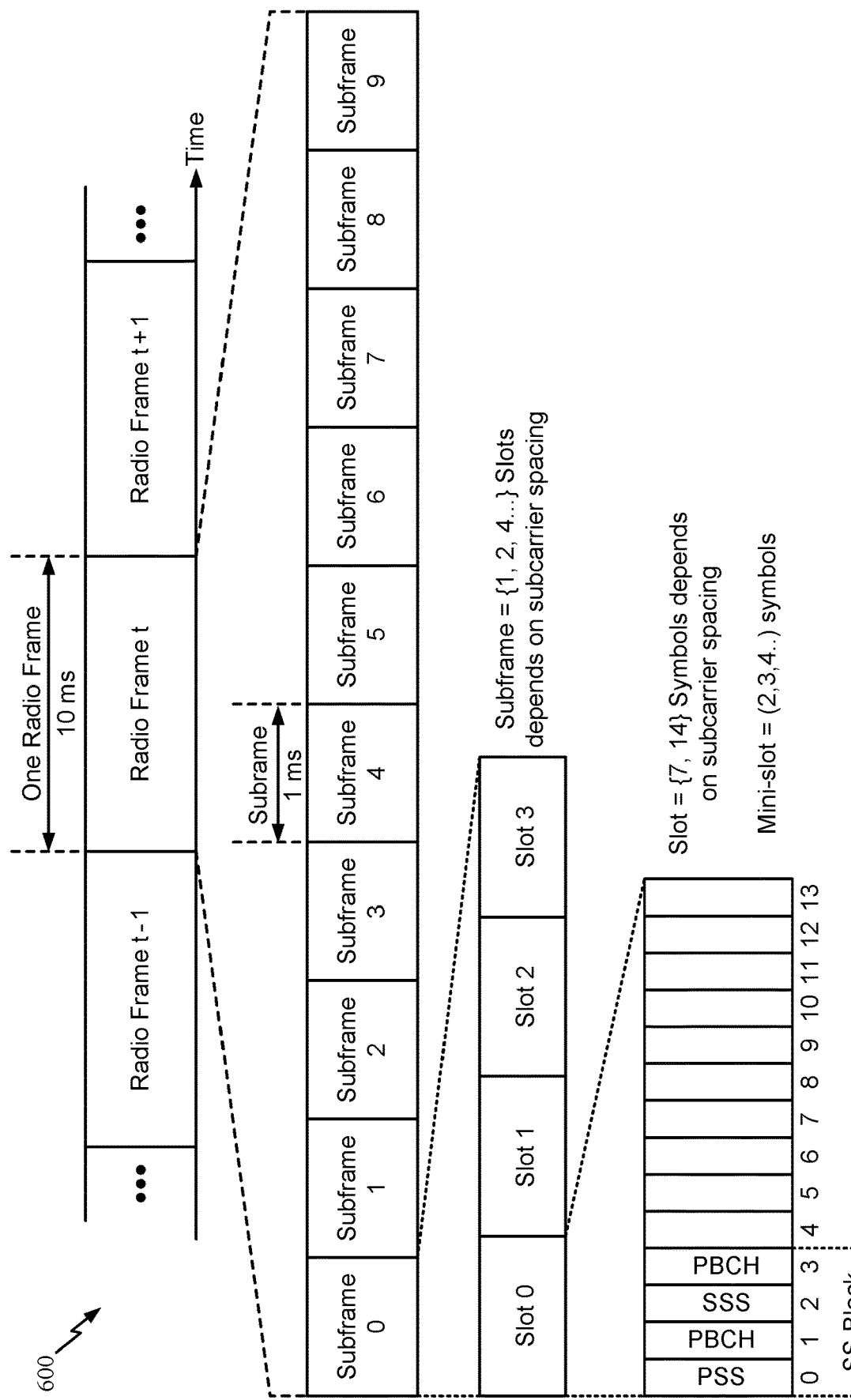
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing; the SSS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multiplexing of HARQ and CSI on PUCCH

According to aspects of the present disclosure, a user equipment may use a physical uplink control channel (PUCCH) to send uplink control information (UCI) to a base station (e.g., a gNB). Different types of UCI include hybrid automatic retransmission request (HARQ) responses (e.g., acknowledgments and negative acknowledgments, or ACK/NAKs) to indicate whether the UE correctly received downlink transport blocks, channel state information (CSI) to assist the base station (BS) with downlink channel-related scheduling determinations, and scheduling requests (SR) to request uplink resources for the UE to use to transmit data.

In NR, there are at most up to two PUCCHs that can be scheduled per slot, with each of the two PUCCHs containing one or more UCI types.

In NR, a BS can semi-statically configure a UE with separate PUCCH resources for each type of UCI. These PUCCH resources can be time-domain or frequency-domain multiplexed and are available per slot. If the UE has UCI to send, then the UE sends the UCI via the PUCCH resources corresponding to that type of UCI.

In previously known techniques (e.g., NR) each PUCCH resource is configured by the BS and contains the following parameters:
1. PUCCH Format Type—An indication of which common format level parameters to apply to this PUCCH resource. All resources designated with the same format type share these common resources;
2. Starting Symbol Index—The initial symbol to begin transmitting the PUCCH using this resource; and
3. Number of Symbols—The number of contiguous symbols on which to transmit the PUCCH using this resource.

In previously known techniques, when a UE has both a HARQ response and CSI to send in a slot and the individual PUCCH resources for HARQ response and CSI overlap in time, the UE multiplexes the individual resources into a new combined PUCCH resource that may have its own time-domain behavior (i.e., starting symbol index and number of symbols, as described above). The new PUCCH resource is selected by the UE determining the combined payload of the HARQ response and CSI and selecting a PUCCH resource large enough for transmission of the combined payload of the HARQ response and CSI. The new PUCCH resource may be different from either one of the initial PUCCH resources. This practice of combining PUCCH resources happens in an iterative loop until all overlapping PUCCH resources that the UE may have selected for transmitting UCI in a slot have been multiplexed.

In previously known techniques, a flag referred to as the simultaneousHARQ-ACK-CSI flag (also referred to herein as a "simultaneousHARQ-ACK-CSI field" and a "HARQ-CSI flag") is a common parameter provided for each PUCCH format and is used to determine whether HARQ responses and CSI can be multiplexed. If the flag is FALSE or not provided (e.g., by a base station in a system information block (SIB)), then the CSI is dropped and only the HARQ response is transmitted. In situations in which the BS expects that HARQ responses and CSI are multiplexed, dropping of the CSI may cause some issues in previously known techniques.

In previously known techniques, one simultaneousHARQ-ACK-CSI flag is provided (e.g., by a base station) per PUCCH format. It is possible that the PUCCH resources provided for HARQ responses and CSI do not both have the simultaneousHARQ-ACK-CSI flag provided. That is, it is possible that a PUCCH resource for a HARQ response does not have the simultaneousHARQ-ACK-CSI flag provided while the PUCCH resource for CSI has the simultaneousHARQ-ACK-CSI flag provided, or vice-versa, or that the two PUCCH resources have the simultaneousHARQ-ACK-CSI flag provided with a first PUCCH resource indicating HARQ responses and CSI can be multiplexed while a second PUCCH resource indicates that HARQ responses and CSI cannot be multiplexed. In such cases, the UE does not know whether to multiplex the HARQ response and the CSI or not.

In previously known techniques, it is possible that the two individual PUCCH resources for HARQ responses and CSI both contain the simultaneousHARQ-ACK-CSI flag, but after multiplexing of the HARQ response and the CSI, the UE selects a new PUCCH resource (for transmission of the multiplexed HARQ response and CSI) that does not contain this flag (or the flag indicates multiplexing of HARQ responses and CSI is disabled). In this case, there is ambiguity on whether the PUCCH should be sent containing both the HARQ response and CSI on the PUCCH resource that does not allow for multiplexing of HARQ responses and CSI.

Figure 7:
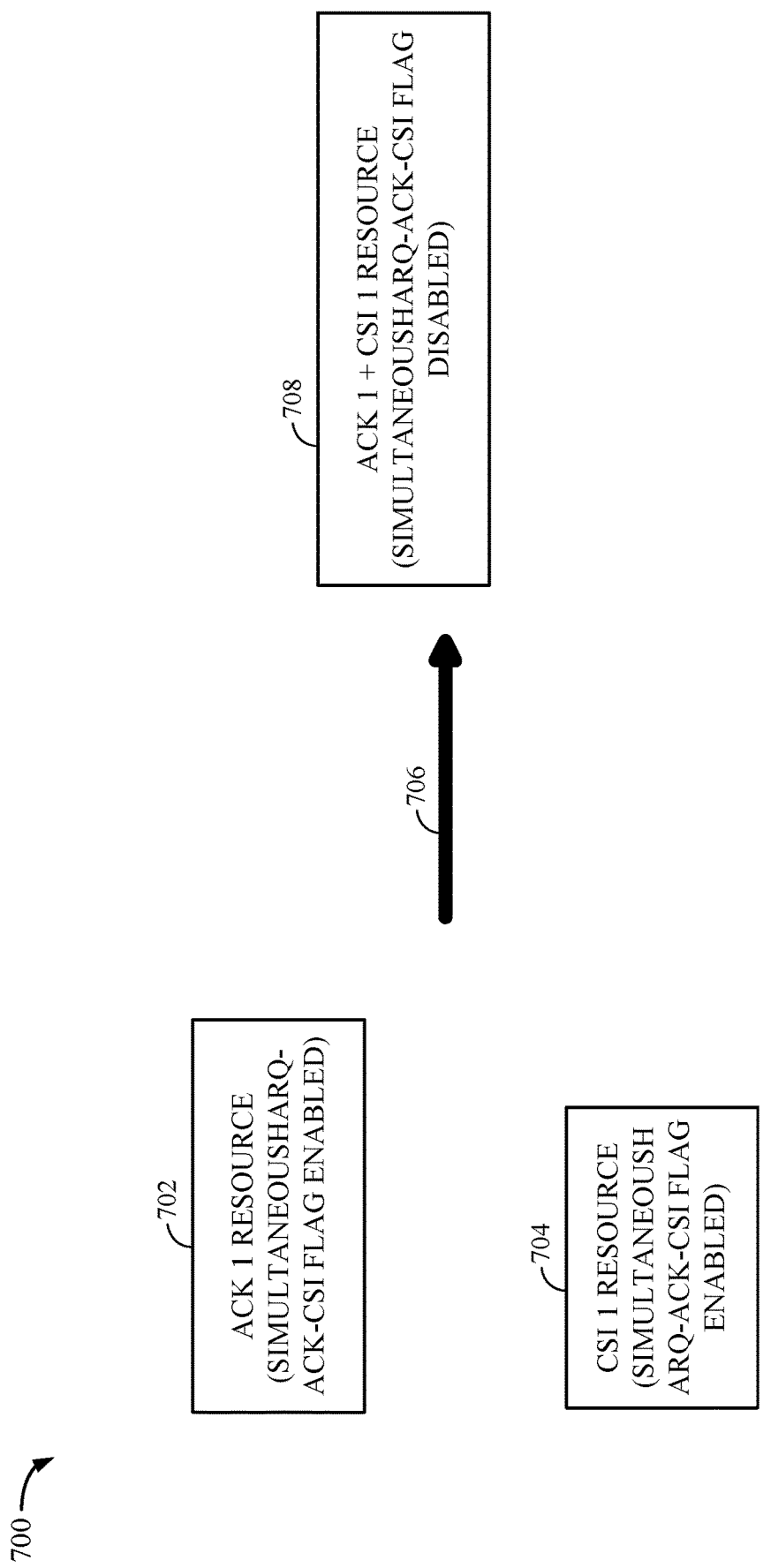
FIG. 7 is a time-frequency resource diagram illustrating a situation of a PUCCH resource for HARQ responses and a PUCCH resource for CSI both containing the simultaneousHARQ-ACK-CSI flag, according to aspects of the present disclosure.

FIG. 7 is a time-frequency resource diagram 700 illustrating the above situation of a PUCCH resource for HARQ responses 702 (i.e., an ACK 1 resource) and a PUCCH resource for CSI 704 (i.e., a CSI 1 resource) both containing the simultaneousHARQ-ACK-CSI flag. As illustrated, the PUCCH resource for HARQ responses 702 and the PUCCH resource for a first CSI 704 overlap in time, and the UE therefore multiplexes the HARQ responses and the first CSI at 706. After multiplexing of the HARQ response and the CSI, the UE at 706 selects a new PUCCH resource 708 (i.e., an ACK 1+CSI 1 resource) that does not contain the simultaneousHARQ-ACK-CSI flag (or the simultaneousHARQ-ACK-CSI flag for the PUCCH resource 708 indicates multiplexing of HARQ responses and CSI is disabled). In such a situation, it is ambiguous whether the UE should send a PUCCH containing both the HARQ response and CSI on the PUCCH resource that does not allow for multiplexing of HARQ responses and CSI.

In previously known techniques, it is also possible that the CSI can be dropped prematurely, in cases in which there is an intermediate PUCCH resource chosen during the iterative loop combining process that does not allow for HARQ response and CSI multiplexing, but the final determined PUCCH resource allows for HARQ responses and CSI to be multiplexed. In this case, there is ambiguity on whether the PUCCH should be sent containing both the HARQ response and CSI on the PUCCH resource when some PUCCH resources referred to during the iterative loop combining process do not allow for multiplexing of HARQ responses and CSI.

Figure 8A:
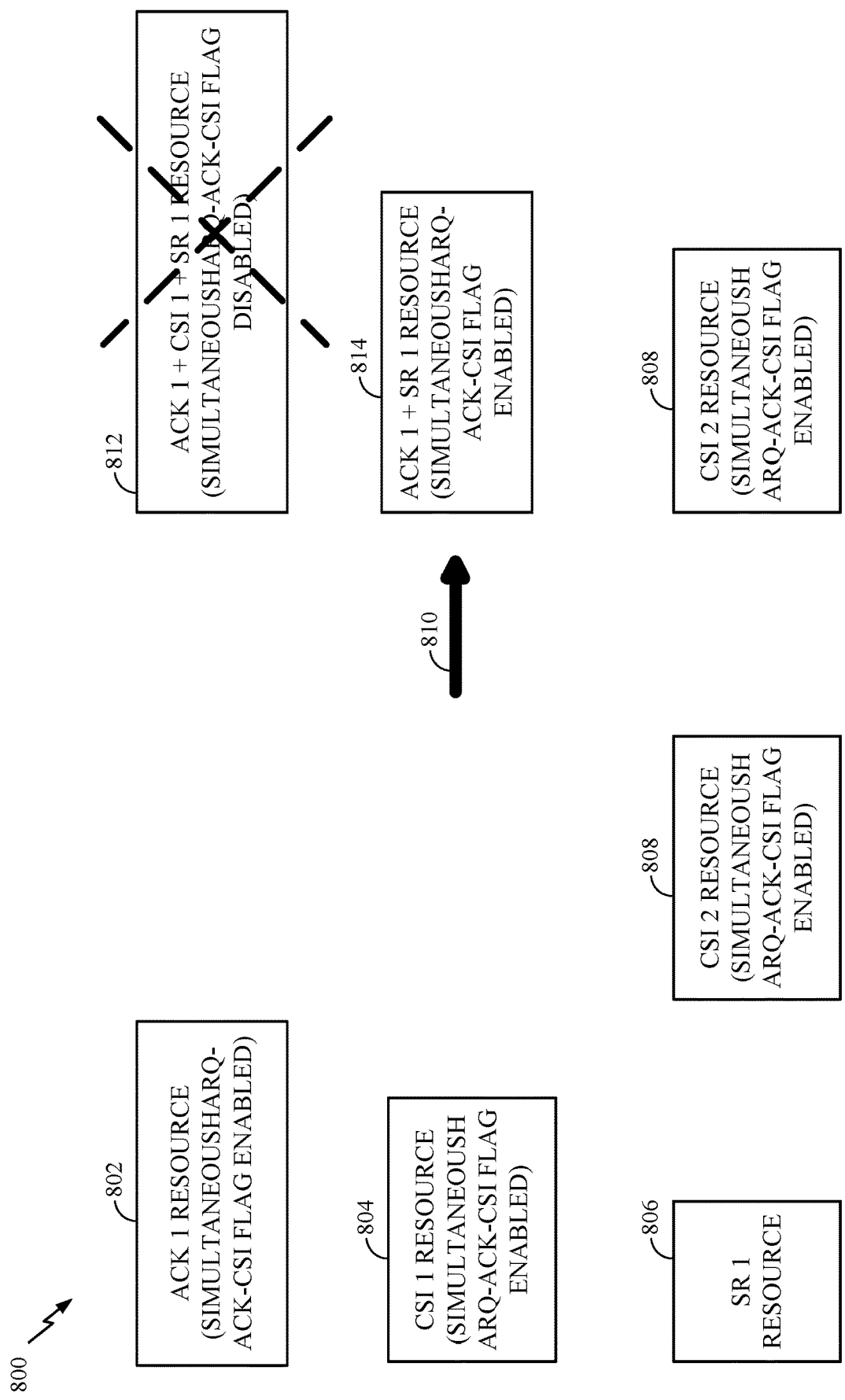
Figure 8B:
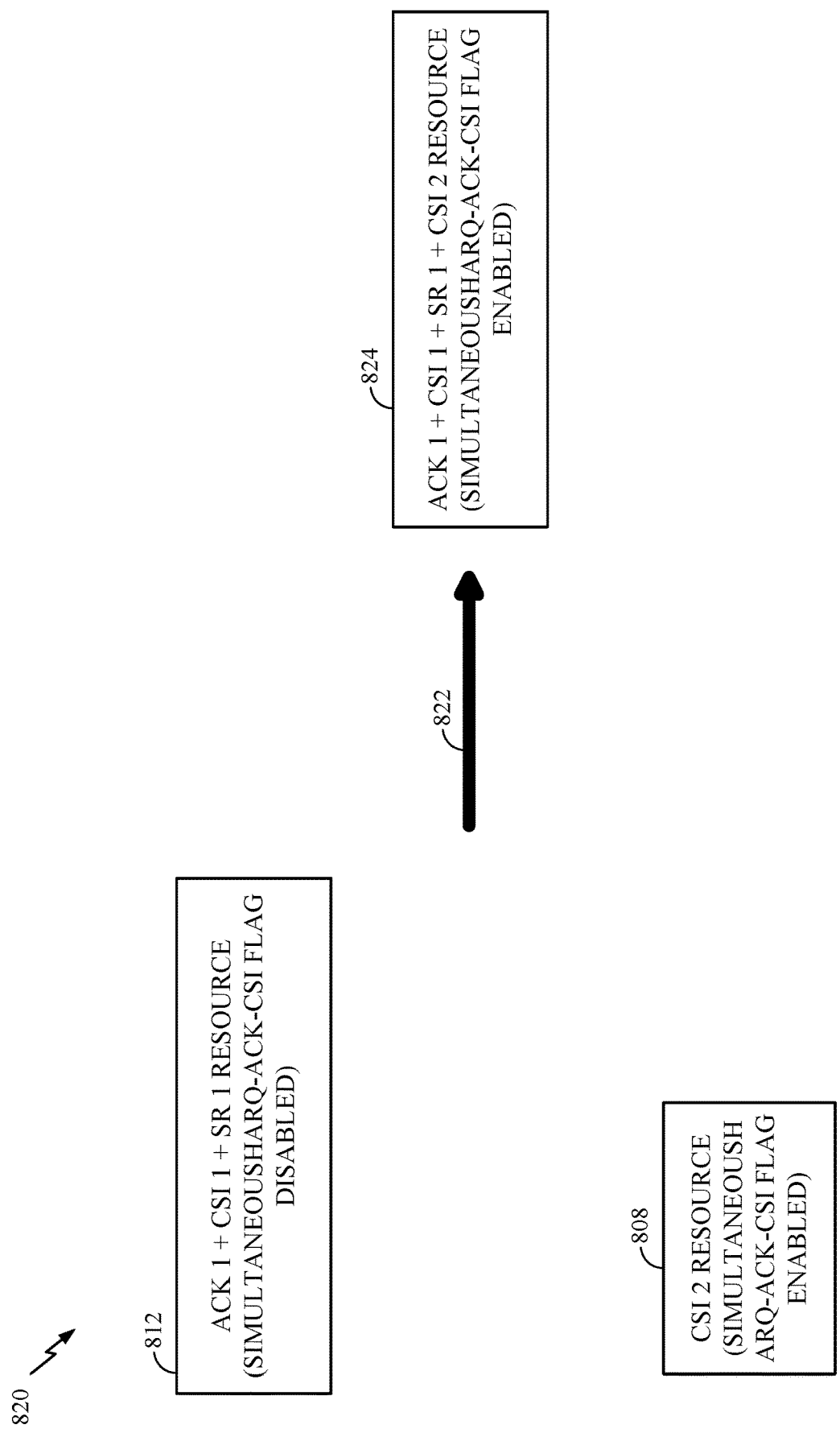

FIGS. 8A-8C are time-frequency resource diagrams illustrating the above situation in which there is an intermediate PUCCH resource chosen during the iterative loop combining process that does not allow for HARQ response and CSI multiplexing, but the final determined PUCCH resource allows for HARQ responses and CSI to be multiplexed.

FIG. 8A is a time-frequency resource diagram 800 illustrating a first loop of an iterative loop combining process in which an intermediate PUCCH resource does not allow for HARQ response and CSI multiplexing, but the final determined PUCCH resource allows for HARQ responses and CSI to be multiplexed. As illustrated, in the first loop of the iterative loop combining process, a UE has selected a first PUCCH resource for HARQ responses 802 (i.e., an ACK 1 resource), a second PUCCH resource for a first CSI 804 (i.e., a CSI 1 resource), a third PUCCH resource for an SR 806 (i.e., an SR 1 resource) and a fourth PUCCH resource for a second CSI 808 (i.e., a CSI 2 resource). As illustrated, the first PUCCH resource for HARQ responses 802, the second PUCCH resource for a first CSI 804, and the third PUCCH resource for SRs 806 overlap in time, and the UE therefore multiplexes the HARQ responses, first CSI, and SR at 810. After multiplexing of the HARQ response, the first CSI, and the SR, the UE at 810 selects a new PUCCH resource 812 (i.e., an ACK 1+CSI 1+SR 1 resource) that does not contain the simultaneousHARQ-ACK-CSI flag (or the simultaneousHARQ-ACK-CSI flag for the PUCCH resource 812 indicates multiplexing of HARQ responses and CSI is disabled). The new PUCCH resource 812 overlaps the fourth PUCCH resource for the second CSI 808 in time, and the UE therefore determines that the second CSI should be multiplexed with the HARQ responses, first CSI, and SR. However, in such a situation, it is ambiguous whether the UE should drop the first CSI because the simultaneousHARQ-ACK-CSI flag for the PUCCH resource 812 indicates multiplexing of HARQ responses and CSI is disabled, as symbolized by the dashed-line "X" over the new PUCCH resource 812. If the UE drops the first CSI, then the UE selects another PUCCH resource 814 for transmission of the HARQ responses and the SR. As illustrated, the PUCCH resource 814 overlaps the fourth PUCCH resource 808 for the second CSI 808 in time, and the UE therefore determines that the second CSI should be multiplexed with the HARQ responses and the SR.

FIG. 8B is a time-frequency resource diagram 820 illustrating a second loop of the iterative loop combining process whose first loop was illustrated in FIG. 8A. As illustrated, in the first loop of the iterative loop combining process, the UE did not drop the first CSI and selected a new PUCCH resource 812 (i.e., an ACK 1+CSI 1+SR 1 resource) that does not contain the simultaneousHARQ-ACK-CSI flag (or the simultaneousHARQ-ACK-CSI flag for the PUCCH resource 812 indicates multiplexing of HARQ responses and CSI is disabled) for the multiplexed HARQ responses, first CSI, and SR. The new PUCCH resource 812 overlaps the fourth PUCCH resource for the second CSI 808 in time, and the UE therefore multiplexes the second CSI with the HARQ responses, first CSI, and SR at 822. The UE then selects a PUCCH resource 824 for transmission of the multiplexed HARQ responses, first CSI, SR, and second CSI.

FIG. 8C is a time-frequency resource diagram 840 illustrating an alternative second loop of the iterative loop combining process whose first loop was illustrated in FIG. 8A. As illustrated, in the first loop of the iterative loop combining process, the UE dropped the first CSI and selected a new PUCCH resource 814 (i.e., an ACK 1+SR 1 resource) with the simultaneousHARQ-ACK-CSI flag enabled for the multiplexed HARQ responses and SR. The new PUCCH resource 814 overlaps the fourth PUCCH resource for the second CSI 808 in time, and the UE therefore multiplexes the second CSI with the HARQ responses, first CSI, and SR at 842. The UE then selects a PUCCH resource 844 for transmission of the multiplexed HARQ responses, SR, and second CSI.

According to aspects of the present disclosure, a base station (e.g., a gNB) may transmit an indication (e.g., in a SIB) that a simultaneousHARQ-ACK-CSI flag applies to all PUCCHs. For example, the simultaneousHARQ-ACK-CSI flag is moved out of the PUCCH-formatConfig and into the top level of PUCCH-Config. In the example, having the simultaneousHARQ-ACK-CSI flag apply at the PUCCH-Config. level aligns the flag across all PUCCH formats and has the added benefit of reducing base station signaling.

In aspects of the present disclosure, a UE may receive signaling (e.g., from a base station in a SIB) indicating that a simultaneousHARQ-ACK-CSI flag applies to all PUCCHs. The UE may, if the simultaneousHARQ-ACK-CSI flag is enabled, multiplex CSI and HARQ responses in all PUCCH resources.

Figure 9:
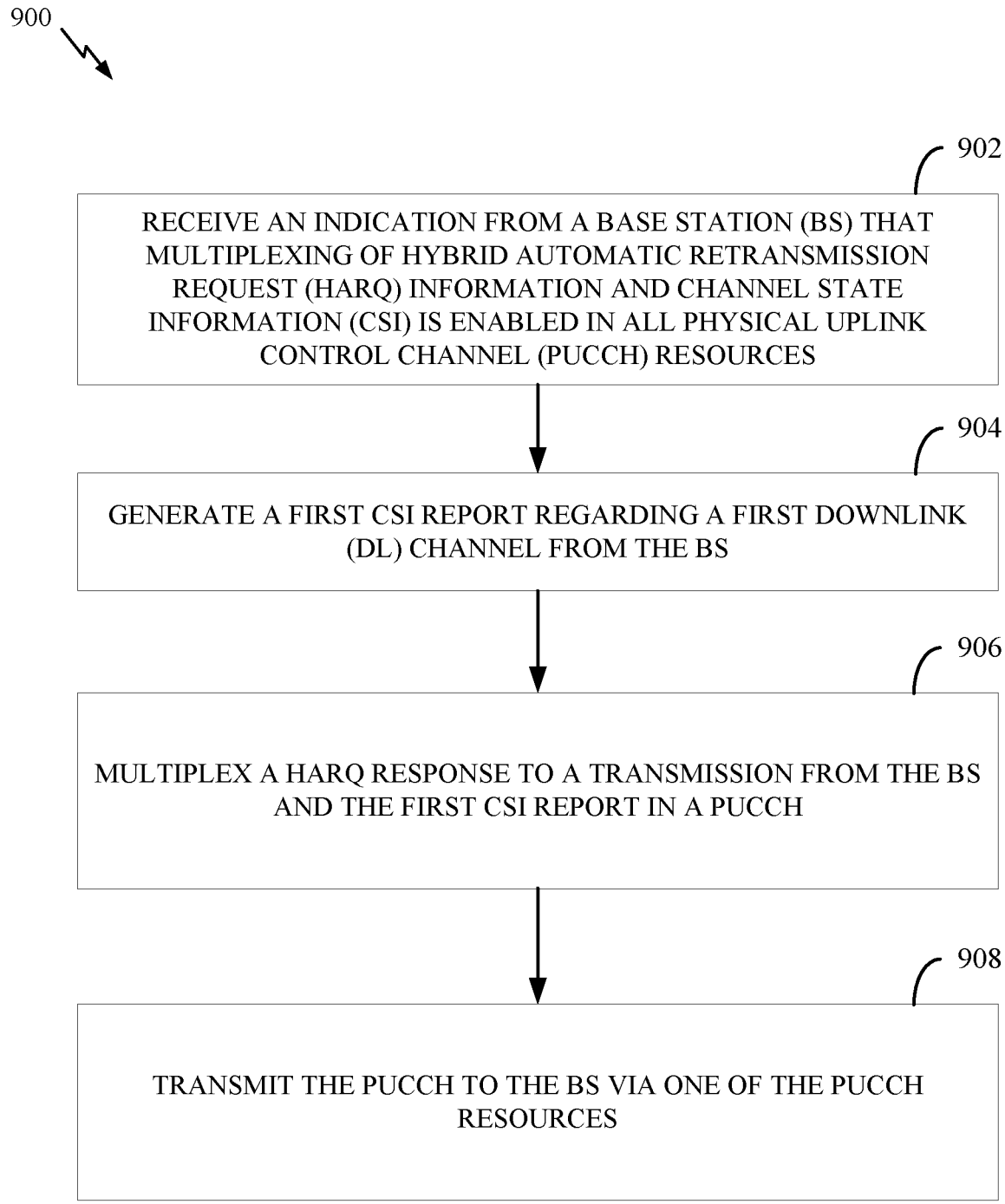
FIG. 9 is a flow diagram illustrating operations for wireless communications that may be performed by a UE to multiplex CSI and HARQ responses in a PUCCH, according to aspects of the present disclosure.

FIG. 9 is a flow diagram illustrating operations 900 for wireless communications that may be performed by a UE (e.g., UE 120, shown in FIGS. 1 and 4), to multiplex CSI and HARQ responses in a PUCCH. At block 902, operations 900 begin with the UE receiving an indication from a base station (BS) that multiplexing of hybrid automatic retransmission request (HARQ) information and channel state information (CSI) is enabled in all physical uplink control channel (PUCCH) resources. Operations 900 continue at block 904 with the UE generating a first CSI report regarding a first downlink (DL) channel from the BS. At block 906, operations 900 continue with the UE multiplexing a HARQ response to a transmission from the BS and the first CSI report in a PUCCH. Operations 900 continue at block 908 with the UE transmitting the PUCCH to the BS via one of the PUCCH resources.

According to aspects of the present disclosure, a UE performing operations 900 may multiplex the HARQ response, the first CSI report, and a scheduling request (SR) in the PUCCH in block 906.

In aspects of the present disclosure, a UE performing operations 900 may multiplex a second CSI report, regarding a second DL channel from the BS, in the PUCCH with the HARQ response and the first CSI report.

Figure 10:
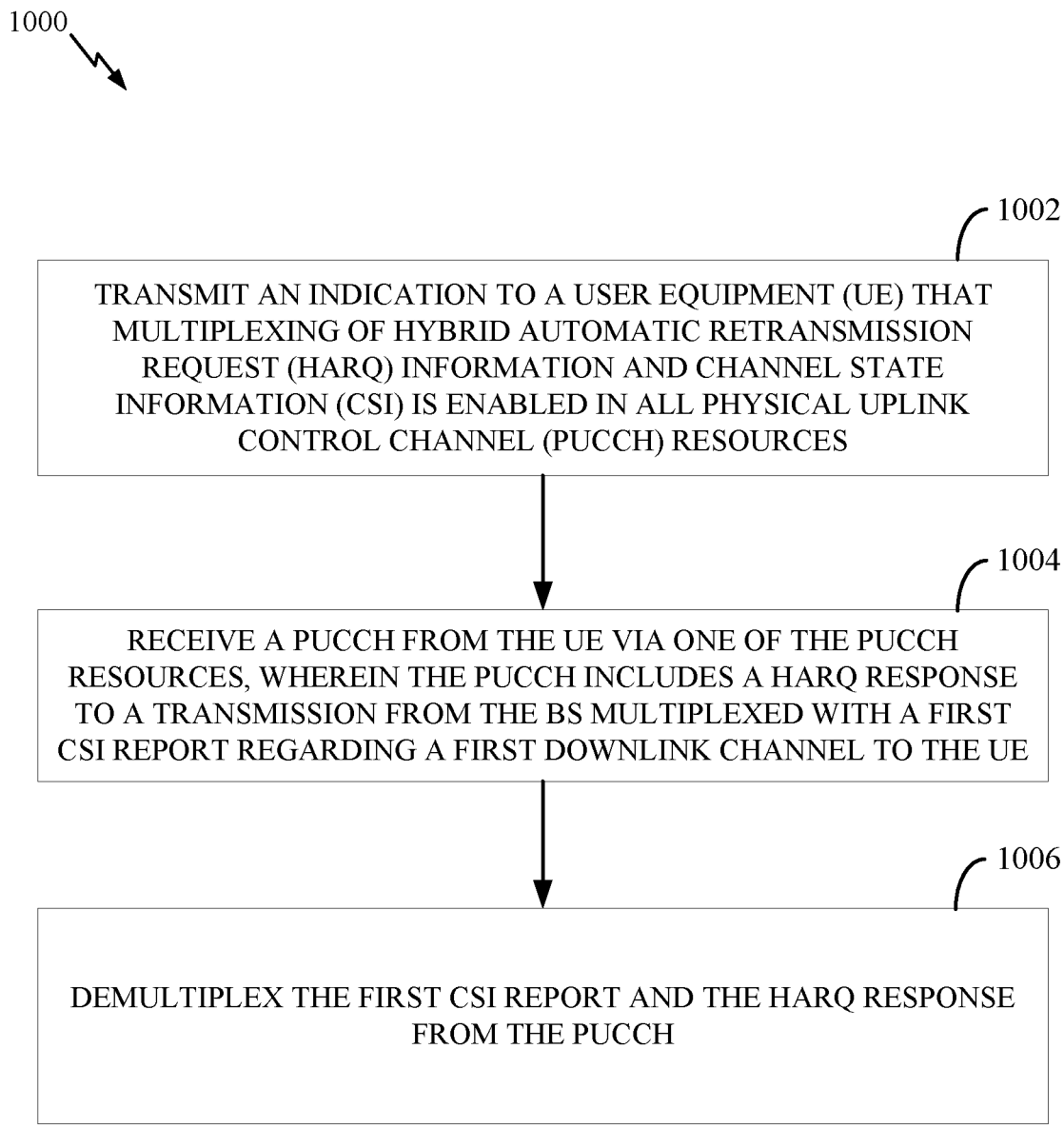
FIG. 10 is a flow diagram illustrating operations for wireless communications that may be performed by a BS to enable multiplexing of CSI and HARQ responses in a PUCCH, according to aspects of the present disclosure.

FIG. 10 is a flow diagram illustrating operations 1000 for wireless communications that may be performed by a BS (e.g., BS 110, shown in FIGS. 1 and 4) to enable multiplexing of CSI and HARQ responses in a PUCCH. Operations 1000 may be considered complementary to operations 900, described above with reference to FIG. 9. At block 1002, operations 1000 begin with the BS transmitting an indication to a user equipment (UE) that multiplexing of hybrid automatic retransmission request (HARQ) information and channel state information (CSI) is enabled in all physical uplink control channel (PUCCH) resources. Operations 1000 continue at block 1004 with the BS receiving a PUCCH from the UE via one of the PUCCH resources, wherein the PUCCH includes a HARQ response to a transmission from the BS multiplexed with a first CSI report regarding a first downlink channel to the UE. At block 1006, operations 1000 continue with the BS demultiplexing the first CSI report and the HARQ response from the PUCCH.

According to aspects of the present disclosure, the PUCCH may include a scheduling request (SR) from the UE, and a BS performing operations 1000 may demultiplex the SR from the PUCCH.

In aspects of the present disclosure, the PUCCH may include a second CSI report regarding the first DL channel or a second DL channel to the UE, and a BS performing operations 1000 may demultiplex the second CSI report from the PUCCH.

According to aspects of the present disclosure, demultiplexing a HARQ response, CSI report, and/or SR from a PUCCH (e.g., as mentioned in block 1006 of operations 1000) may include: demodulating the PUCCH; decoding the PUCCH; and/or determining the HARQ response, the CSI report, and/or the SR.

In aspects of the present disclosure, a UE may prepare an initial set of PUCCH resources to multiplex by checking for the simultaneousHARQ-ACK-CSI flag among the various HARQ and CSI resources to be multiplexed. After these initial checks, the UE considers the simultaneousHARQ-ACK-CSI check complete. During the iterative loop combining process, even if one or more of the newly selected PUCCH resources containing multiplexed UCI do not have simultaneousHARQ-ACK-CSI flag set, the UE continues to multiplex HARQ and CSI on the newly selected PUCCH resources.

Figure 11A:
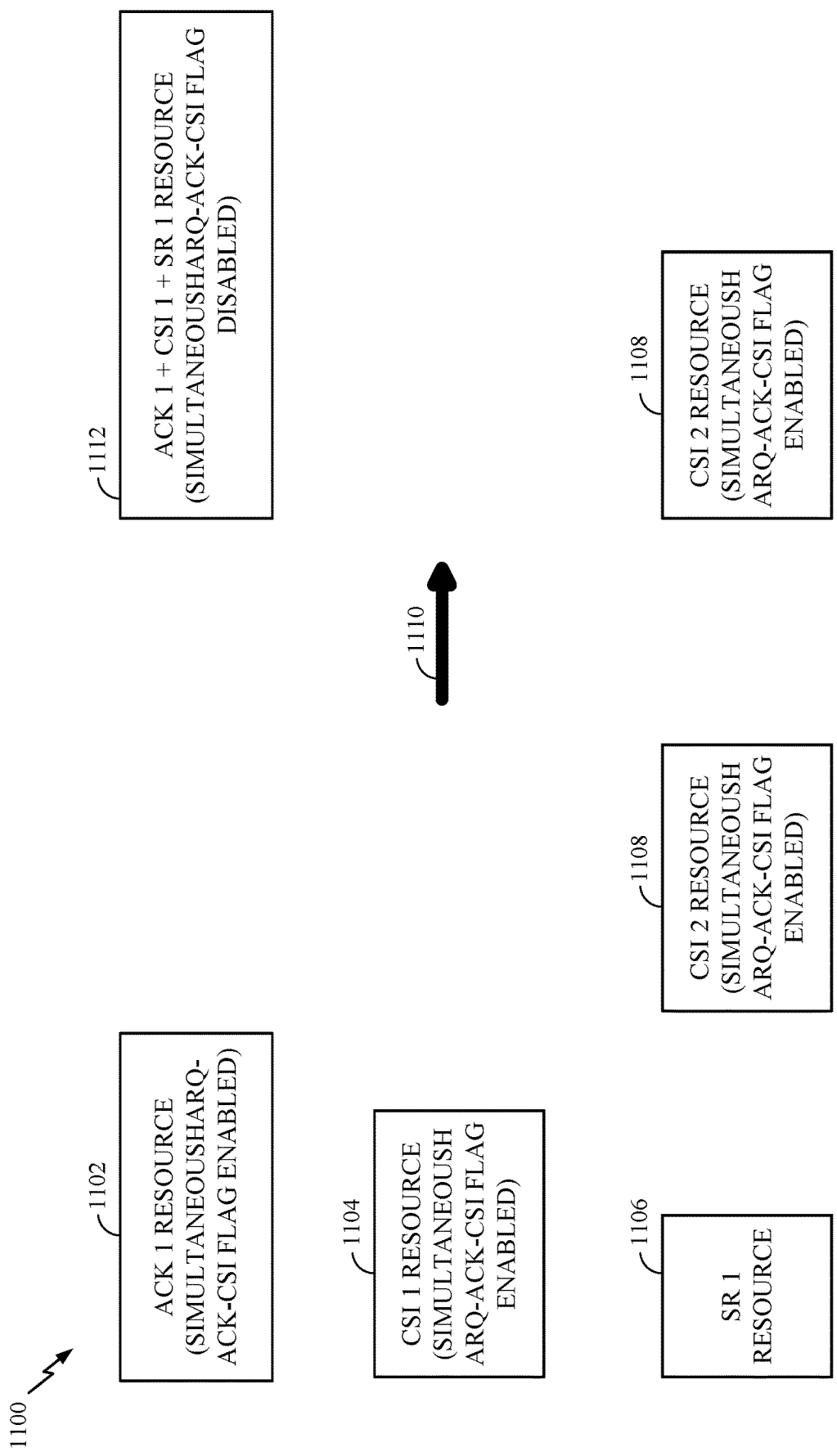
FIGS. 11A-11B are time-frequency resource diagrams illustrating a situation in which a UE prepares an initial set of PUCCH resources to multiplex by checking for the simultaneousHARQ-ACK-CSI flag among the various HARQ and CSI resources to be multiplexed, according to aspects of the present disclosure.
Figure 11B:
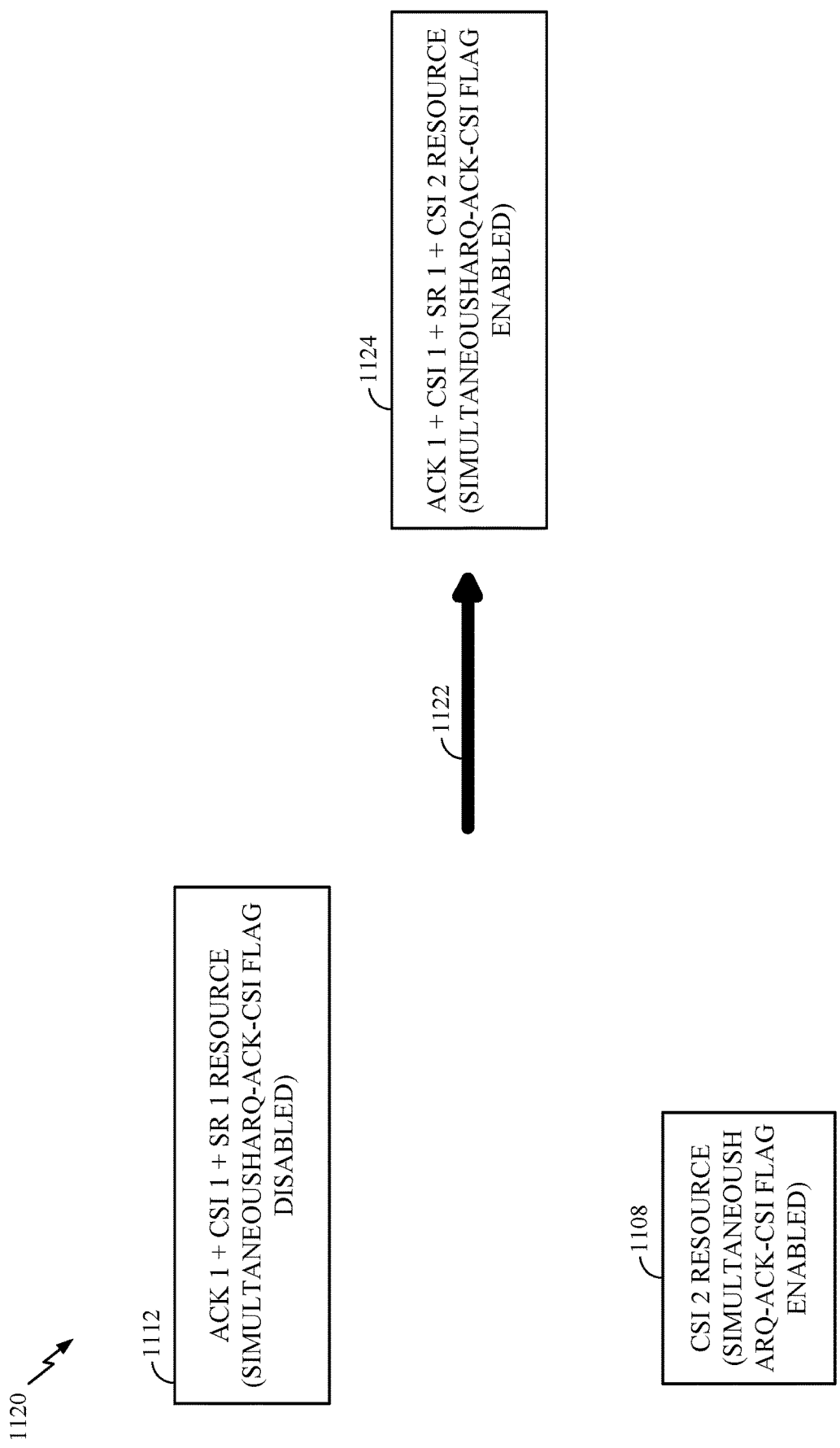

FIGS. 11A-11B are time-frequency resource diagrams illustrating the above situation in which a UE prepares an initial set of PUCCH resources to multiplex by checking for the simultaneousHARQ-ACK-CSI flag among the various HARQ and CSI resources to be multiplexed. After these initial checks, the UE considers the simultaneousHARQ-ACK-CSI check complete and multiplexes HARQ responses and CSI on the final selected set of PUCCH resources, even if one or more of the newly selected PUCCH resources containing multiplexed UCI do not have the simultaneousHARQ-ACK-CSI flag set.

FIG. 11A is a time-frequency resource diagram 1100 illustrating a first loop of an iterative loop combining process in which a UE may prepare an initial set of PUCCH resources to multiplex by checking for the simultaneousHARQ-ACK-CSI flag among the various HARQ and CSI resources to be multiplexed, and then, after these initial checks, the UE considers the simultaneousHARQ-ACK-CSI check complete. As illustrated, in the first loop of the iterative loop combining process, a UE has selected a first PUCCH resource for HARQ responses 1102 (i.e., an ACK 1 resource), a second PUCCH resource for a first CSI 1104 (i.e., a CSI 1 resource), a third PUCCH resource for an SR 1106 (i.e., an SR 1 resource) and a fourth PUCCH resource for a second CSI 1108 (i.e., a CSI 2 resource). The UE checks that each of the PUCCH resources 1102, 1104, 1106, and 1108 has the simultaneousHARQ-ACK-CSI flag enabled and determines that overlapping PUCCH resources containing HARQ responses or CSI can be multiplexed. As illustrated, the first PUCCH resource for HARQ responses 1102, the second PUCCH resource for a first CSI 1104, and the third PUCCH resource for SRs 1106 overlap in time, and the UE therefore multiplexes the HARQ responses, first CSI, and SR at 1110. After multiplexing of the HARQ response, the first CSI, and the SR, the UE at 1110 selects a new PUCCH resource 1112 (i.e., an ACK 1+CSI 1+SR 1 resource) that does not contain the simultaneousHARQ-ACK-CSI flag (or the simultaneousHARQ-ACK-CSI flag for the PUCCH resource 1112 indicates multiplexing of HARQ responses and CSI is disabled). Because the UE previously determined that the overlapping PUCCH resources 1102, 1104, 1106, and 1108 could be multiplexed, the UE does not consider the missing or disabled simultaneousHARQ-ACK-CSI flag for the PUCCH resource 1112 The new PUCCH resource 1112 overlaps the fourth PUCCH resource for the second CSI 1108 in time, and the UE therefore determines that the second CSI should be multiplexed with the HARQ responses, first CSI, and SR.

FIG. 11B is a time-frequency resource diagram 1120 illustrating a second loop of the iterative loop combining process whose first loop was illustrated in FIG. 11A. As illustrated, in the first loop of the iterative loop combining process, the UE selected a new PUCCH resource 1112 (i.e., an ACK 1+CSI 1+SR 1 resource) that does not contain the simultaneousHARQ-ACK-CSI flag (or the simultaneousHARQ-ACK-CSI flag for the PUCCH resource 1112 indicates multiplexing of HARQ responses and CSI is disabled) for the multiplexed HARQ responses, first CSI, and SR. The new PUCCH resource 1112 overlaps the fourth PUCCH resource for the second CSI 1108 in time, and the UE therefore multiplexes the second CSI with the HARQ responses, first CSI, and SR at 1122. The UE then selects a PUCCH resource 1124 for transmission of the multiplexed HARQ responses, first CSI, SR, and second CSI.

Figure 12:
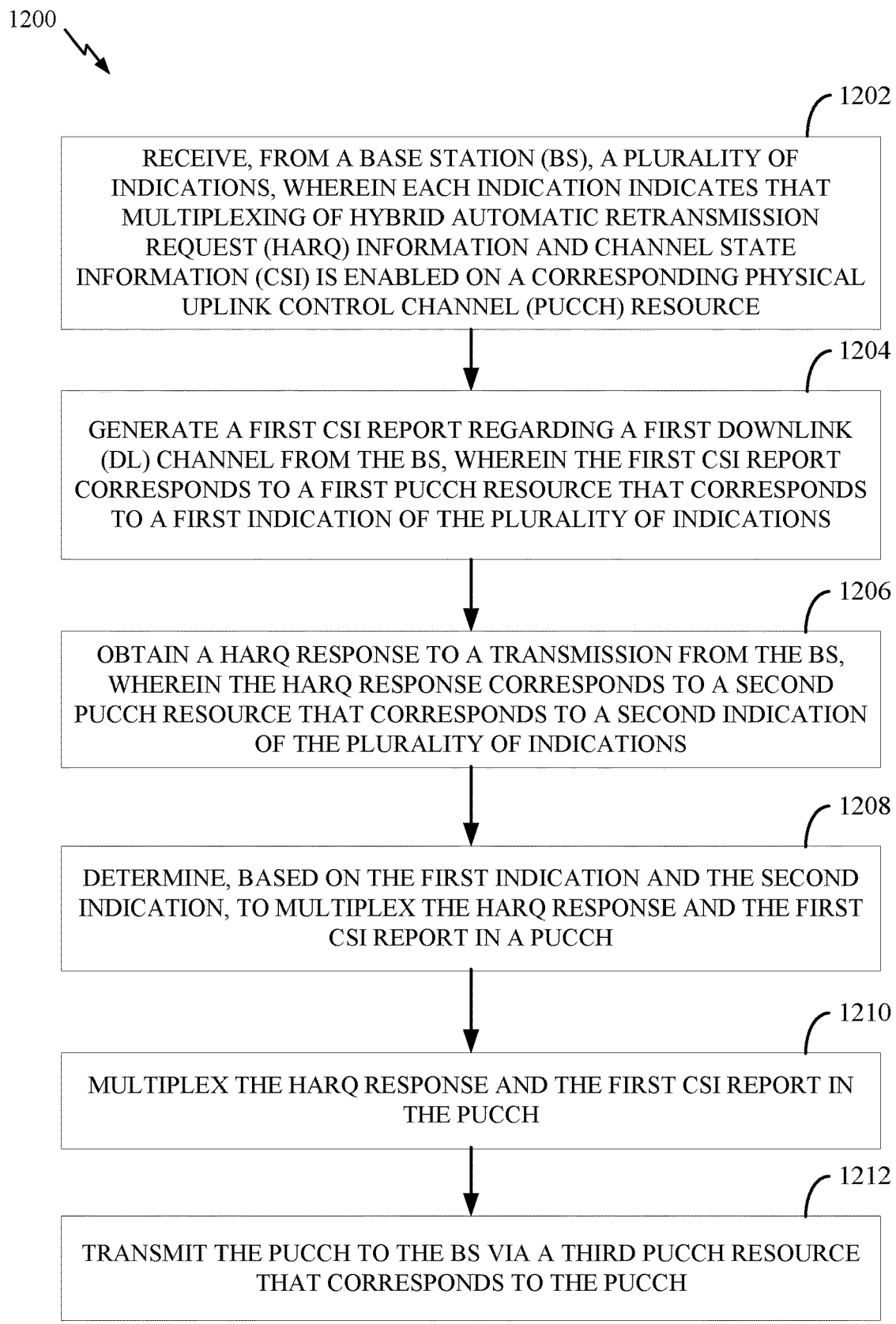
FIG. 12 is a flow diagram illustrating operations for wireless communications that may be performed by a UE to multiplex CSI and HARQ responses in a PUCCH, according to aspects of the present disclosure.

FIG. 12 is a flow diagram illustrating operations 1200 for wireless communications that may be performed by a UE (e.g., UE 120, shown in FIGS. 1 and 4), to multiplex CSI and HARQ responses in a PUCCH. At block 1202, operations 1200 begin with the UE receiving, from a base station (BS), a plurality of indications, wherein each indication indicates that multiplexing of hybrid automatic retransmission request (HARQ) information and channel state information (CSI) is enabled on a corresponding physical uplink control channel (PUCCH) resource. Operations 1200 continue at block 1204 with the UE generating a first CSI report regarding a first downlink (DL) channel from the BS, wherein the first CSI report corresponds to a first PUCCH resource that corresponds to a first indication of the plurality of indications. At block 1206, operations 1200 continue with the UE obtaining a HARQ response to a transmission from the BS, wherein the HARQ response corresponds to a second PUCCH resource that corresponds to a second indication of the plurality of indications. Operations 1200 continue at block 1208 with the UE determining, based on the first indication and the second indication, to multiplex the HARQ response and the first CSI report in a PUCCH. At block 1210, operations 1200 continue with the UE multiplexing the HARQ response and the first CSI report in the PUCCH. Operations 1200 continue at block 1212 with the UE transmitting the PUCCH to the BS via a third PUCCH resource that corresponds to the PUCCH.

According to aspects of the present disclosure, a UE performing operations 1200 may multiplex the HARQ response, the first CSI report, and a scheduling request (SR) in the PUCCH in block 1210.

In aspects of the present disclosure, a UE performing operations 1200 may multiplex a second CSI report, regarding the first DL channel or a second DL channel from the BS, in the PUCCH with the HARQ response and the first CSI report.

Figure 13:
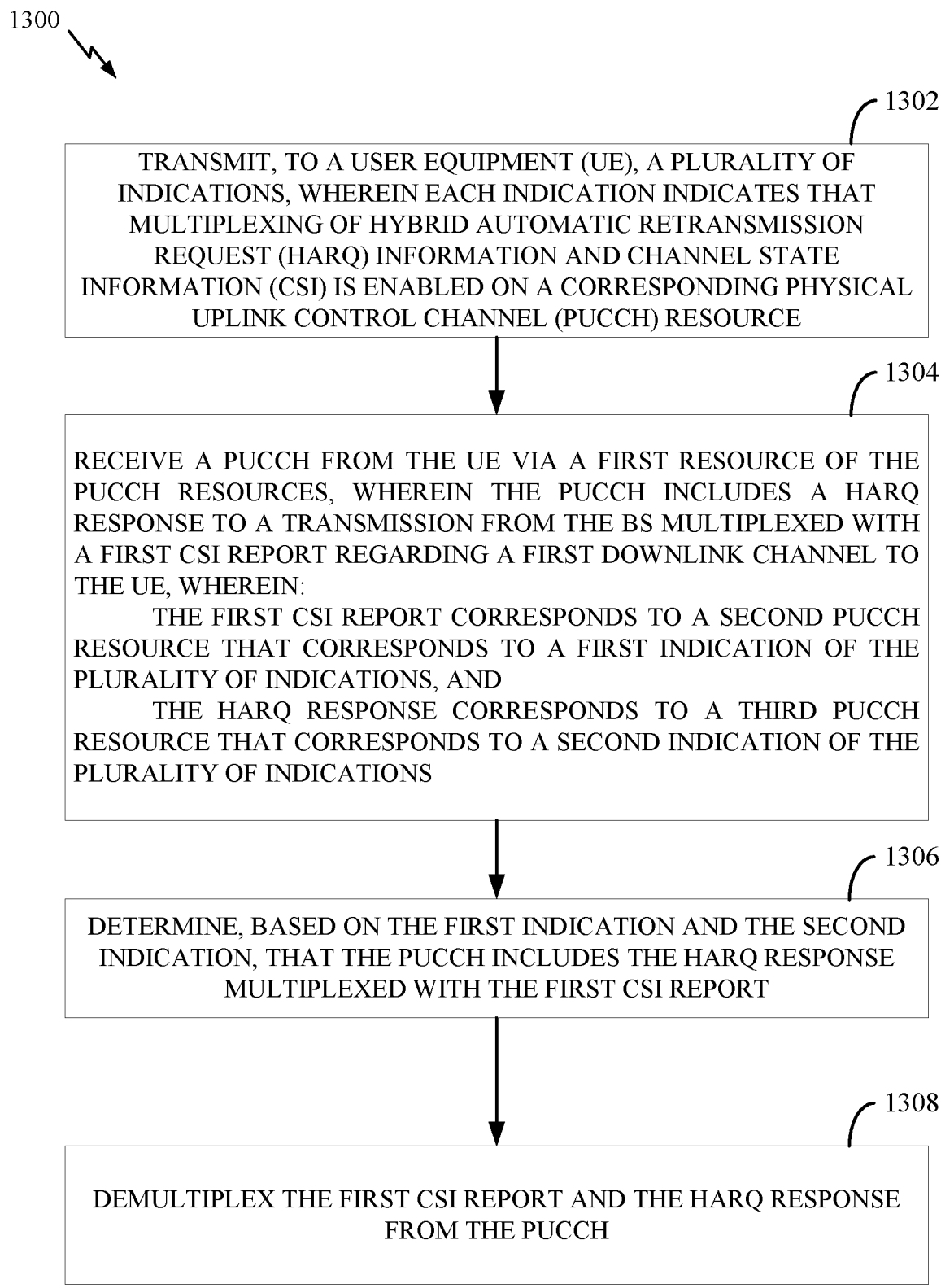
FIG. 13 is a flow diagram illustrating operations for wireless communications that may be performed by a BS to enable multiplexing of CSI and HARQ responses in a PUCCH, according to aspects of the present disclosure.

FIG. 13 is a flow diagram illustrating operations 1300 for wireless communications that may be performed by a BS (e.g., BS 110, shown in FIGS. 1 and 4) to enable multiplexing of CSI and HARQ responses in a PUCCH. Operations 1300 may be considered complementary to operations 1200, described above with reference to FIG. 12. At block 1302, operations 1300 begin with the BS transmitting, to a user equipment (UE), a plurality of indications, wherein each indication indicates that multiplexing of hybrid automatic retransmission request (HARQ) information and channel state information (CSI) is enabled on a corresponding physical uplink control channel (PUCCH) resource. Operations 1300 continue at block 1304 with the BS receiving a PUCCH from the UE via a first resource of the PUCCH resources, wherein the PUCCH includes a HARQ response to a transmission from the BS multiplexed with a first CSI report regarding a first downlink channel to the UE, wherein: the first CSI report corresponds to a second PUCCH resource that corresponds to a first indication of the plurality of indications, and the HARQ response corresponds to a third PUCCH resource that corresponds to a second indication of the plurality of indications. At block 1306, operations 1300 continue with the BS determining, based on the first indication and the second indication, that the PUCCH includes the HARQ response multiplexed with the first CSI report. Operations 1300 continue at block 1308 with the BS demultiplexing the first CSI report and the HARQ response from the PUCCH.

According to aspects of the present disclosure, the PUCCH may include a scheduling request (SR) from the UE, and a BS performing operations 1300 may demultiplex the SR from the PUCCH.

In aspects of the present disclosure, the PUCCH may include a second CSI report regarding the first DL channel or a second DL channel to the UE, and a BS performing operations 1300 may demultiplex the second CSI report from the PUCCH.

According to aspects of the present disclosure, demultiplexing a HARQ response, CSI report, and/or SR from a PUCCH (e.g., as mentioned in block 1308 of operations 1300) may include: demodulating the PUCCH; decoding the PUCCH; and/or determining the HARQ response, the CSI report, and/or the SR.

In aspects of the present disclosure, a UE may not perform a check of the simultaneousHARQ-ACK-CSI flags on PUCCH resources at the beginning of an iterative loop combining process, but still multiplexes all HARQ responses and CSI on overlapping PUCCH resources as previously described herein. At the end of the multiplexing procedure, the UE checks the simultaneousHARQ-ACK-CSI flag for the final set of PUCCH resources and drops CSI (but uses the same selected PUCCH resource) if the flag is not set.

Figure 14A:
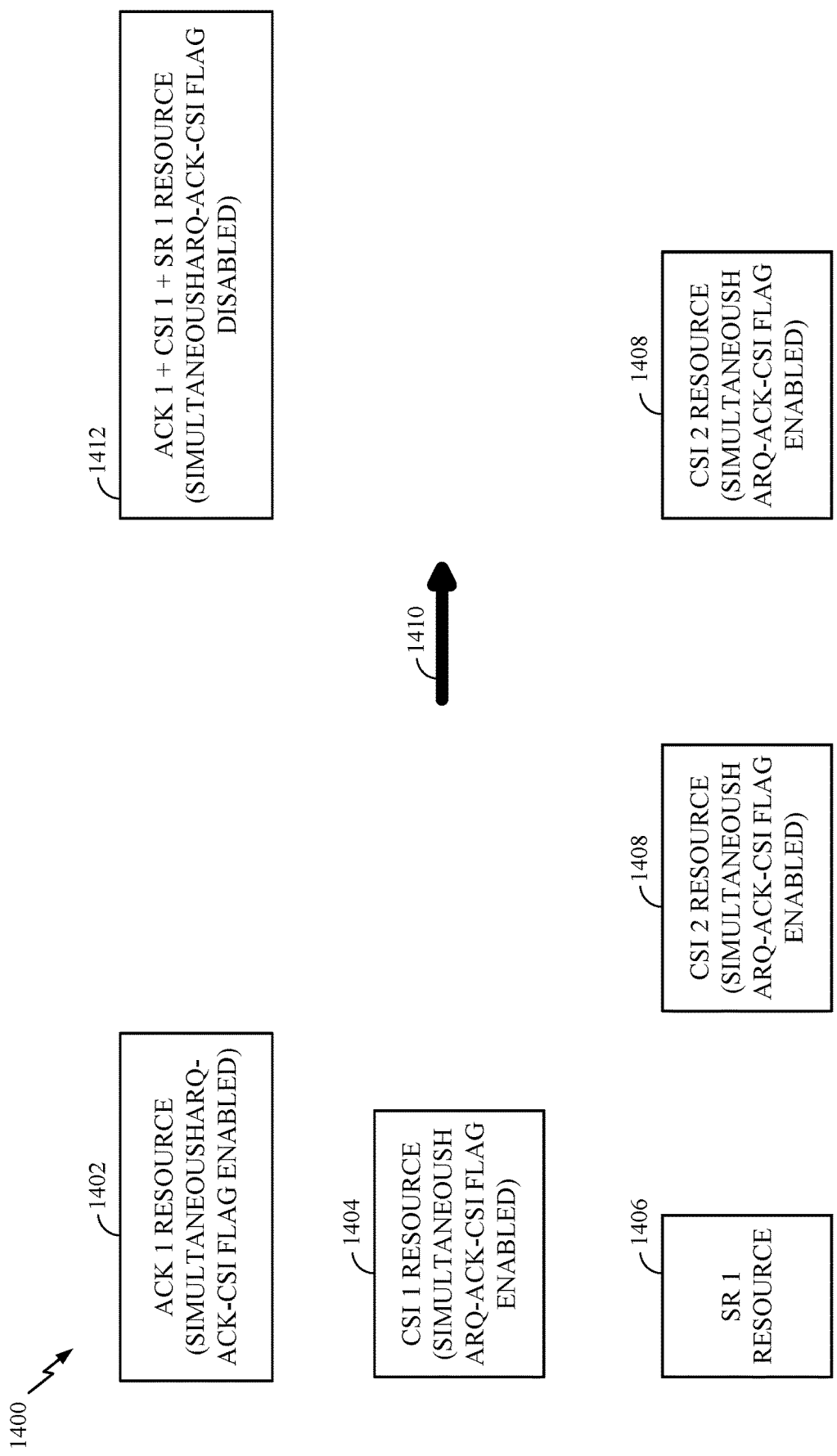
FIGS. 14A-B are time-frequency resource diagrams illustrating a situation in which a UE does not check the simultaneousHARQ-ACK-CSI flags on an initial set of PUCCH resources to multiplex, according to aspects of the present disclosure.
Figure 14B:
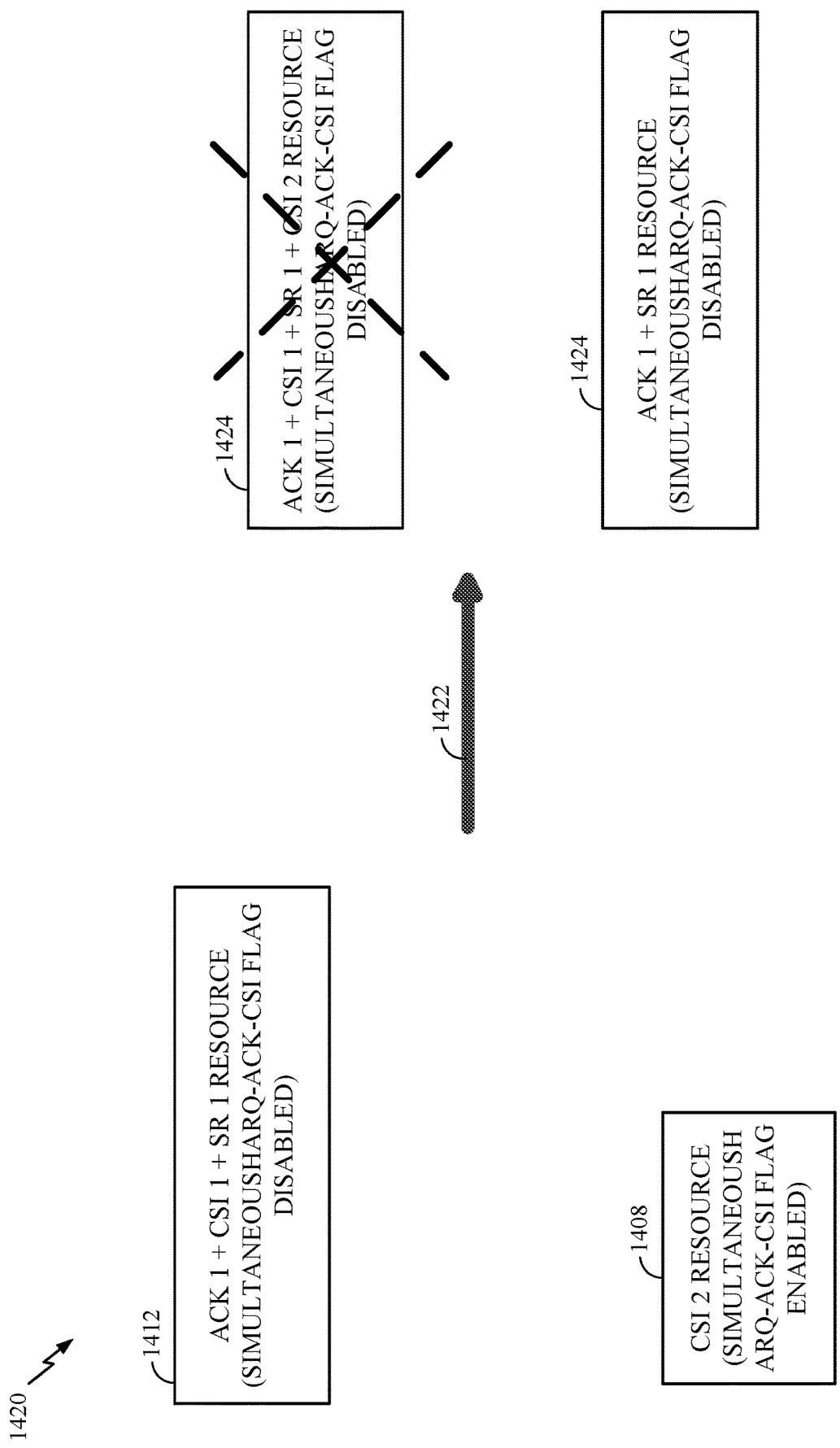

FIGS. 14A-B are time-frequency resource diagrams illustrating the above situation in which a UE does not check the simultaneousHARQ-ACK-CSI flags on an initial set of PUCCH resources to multiplex. Instead, the UE checks the simultaneousHARQ-ACK-CSI flag for the final set of PUCCH resources and drops CSI (but uses the same selected PUCCH resource) if the flag is not set.

FIG. 14A is a time-frequency resource diagram 1400 illustrating a first loop of an iterative loop combining process in which a UE does not check the simultaneousHARQ-ACK-CSI flags on an initial set of PUCCH resources to multiplex, but instead checks only the simultaneousHARQ-ACK-CSI flag for the final set of PUCCH resources and drops CSI (but uses the same selected PUCCH resource) if the flag is not set. As illustrated, in the first loop of the iterative loop combining process, a UE has selected a first PUCCH resource for HARQ responses 1402 (i.e., an ACK 1 resource), a second PUCCH resource for a first CSI 1404 (i.e., a CSI 1 resource), a third PUCCH resource for an SR 1406 (i.e., an SR 1 resource) and a fourth PUCCH resource for a second CSI 1408 (i.e., a CSI 2 resource). As illustrated, the first PUCCH resource for HARQ responses 1402, the second PUCCH resource for the first CSI 1404, and the third PUCCH resource for SRs 1406 overlap in time, and the UE therefore multiplexes the HARQ responses, first CSI, and SR at 1410. After multiplexing of the HARQ response, the first CSI, and the SR, the UE at 1410 selects a new PUCCH resource 1412 (i.e., an ACK 1+CSI 1+SR 1 resource) that does not contain the simultaneousHARQ-ACK-CSI flag (or the simultaneousHARQ-ACK-CSI flag for the PUCCH resource 1112 indicates multiplexing of HARQ responses and CSI is disabled). Because the UE checks only the simultaneousHARQ-ACK-CSI flag for the final set of PUCCH resources, the UE does not consider the missing or disabled simultaneousHARQ-ACK-CSI flag for the PUCCH resource 1412. The new PUCCH resource 1412 overlaps the fourth PUCCH resource for the second CSI 1408 in time, and the UE therefore determines that the second CSI should be multiplexed with the HARQ responses, first CSI, and SR.

FIG. 14B is a time-frequency resource diagram 1420 illustrating a second loop of the iterative loop combining process whose first loop was illustrated in FIG. 14A. As illustrated, in the first loop of the iterative loop combining process, the UE selected a new PUCCH resource 1412 (i.e., an ACK 1+CSI 1+SR 1 resource) that does not contain the simultaneousHARQ-ACK-CSI flag (or the simultaneousHARQ-ACK-CSI flag for the PUCCH resource 1412 indicates multiplexing of HARQ responses and CSI is disabled) for the multiplexed HARQ responses, first CSI, and SR. The new PUCCH resource 1412 overlaps the fourth PUCCH resource for the second CSI 1408 in time, and the UE therefore multiplexes the second CSI with the HARQ responses, first CSI, and SR at 1422. The UE then selects a PUCCH resource 1424 for transmission of the multiplexed HARQ responses, first CSI, SR, and second CSI. The PUCCH resource 1424 does not contain the simultaneousHARQ-ACK-CSI flag (or the simultaneousHARQ-ACK-CSI flag for the PUCCH resource 1424 indicates multiplexing of HARQ responses and CSI is disabled), and the UE therefore drops the first CSI and second CSI, as symbolized by the dashed-line "X" over the PUCCH resource 1424 containing the multiplexed HARQ responses, first CSI, SR, and second CSI. The UE instead transmits the multiplexed HARQ responses and SR via the PUCCH resource 1424.

Figure 15:
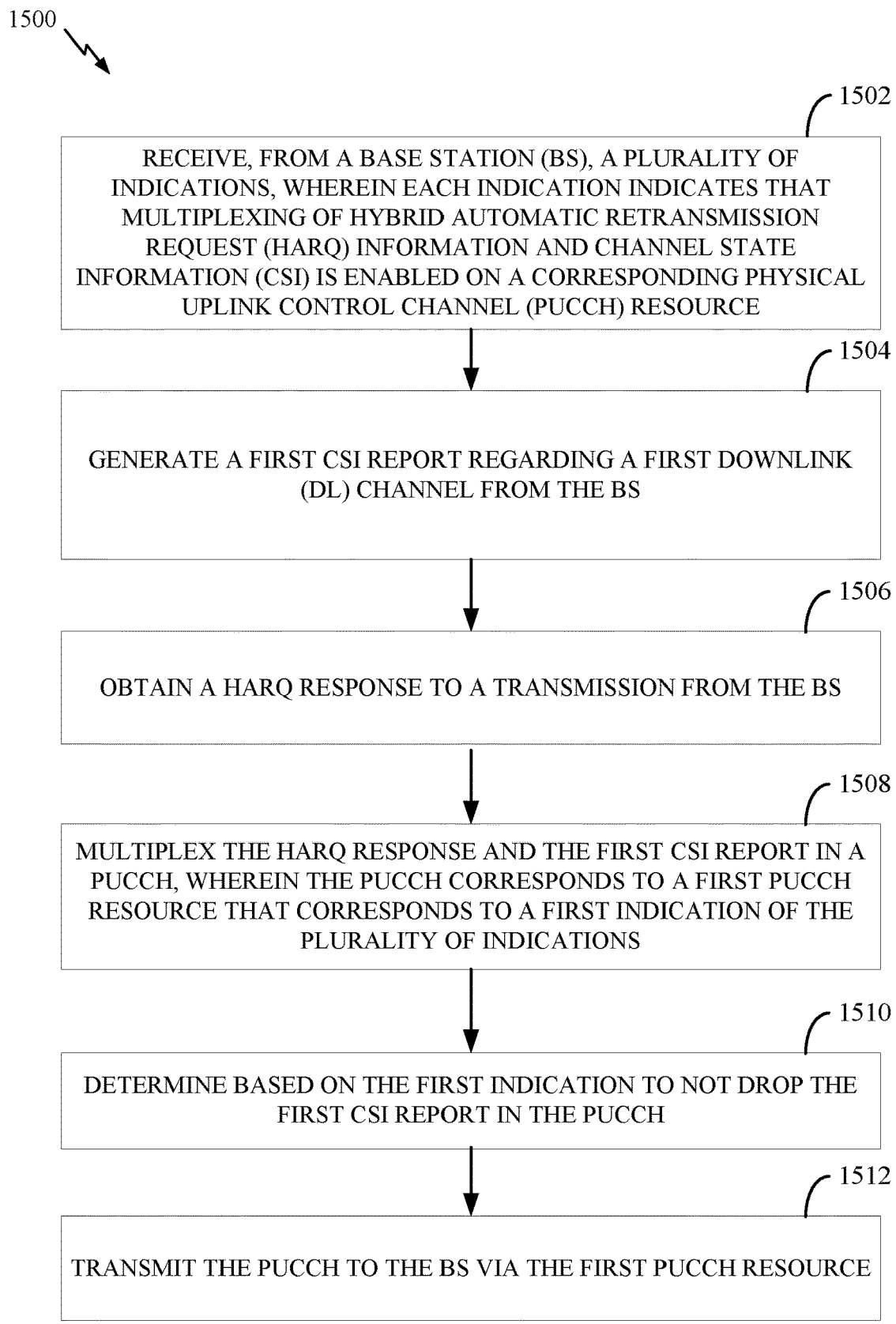
FIG. 15 is a flow diagram illustrating operations for wireless communications that may be performed by a UE to multiplex CSI and HARQ responses in a PUCCH, according to aspects of the present disclosure.

FIG. 15 is a flow diagram illustrating operations 1500 for wireless communications that may be performed by a UE (e.g., UE 120, shown in FIGS. 1 and 4), to multiplex CSI and HARQ responses in a PUCCH. At block 1502, operations 1500 begin with the UE receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource. Operations 1500 continue at block 1504 with the UE generating a first CSI report regarding a first downlink (DL) channel from the BS. At block 1506, operations 1500 continue with the UE obtaining a HARQ response to a transmission from the BS. Operations 1500 continue at block 1508 with the UE multiplexing the HARQ response and the first CSI report in a PUCCH, wherein the PUCCH corresponds to a first PUCCH resource that corresponds to a first indication of the plurality of indications. At block 1510, operations 1500 continue with the UE determining based on the first indication to not drop the first CSI report in the PUCCH. Operations 1500 continue at block 1512 with the UE transmitting the PUCCH to the BS via the first PUCCH resource.

According to aspects of the present disclosure, a UE performing operations 1500 may multiplex the HARQ response, the first CSI report, and a scheduling request (SR) in the PUCCH in block 1508.

In aspects of the present disclosure, a UE performing operations 1500 may multiplex a second CSI report, regarding the first DL channel or a second DL channel from the BS, in the PUCCH with the HARQ response and the first CSI report.

Figure 16:
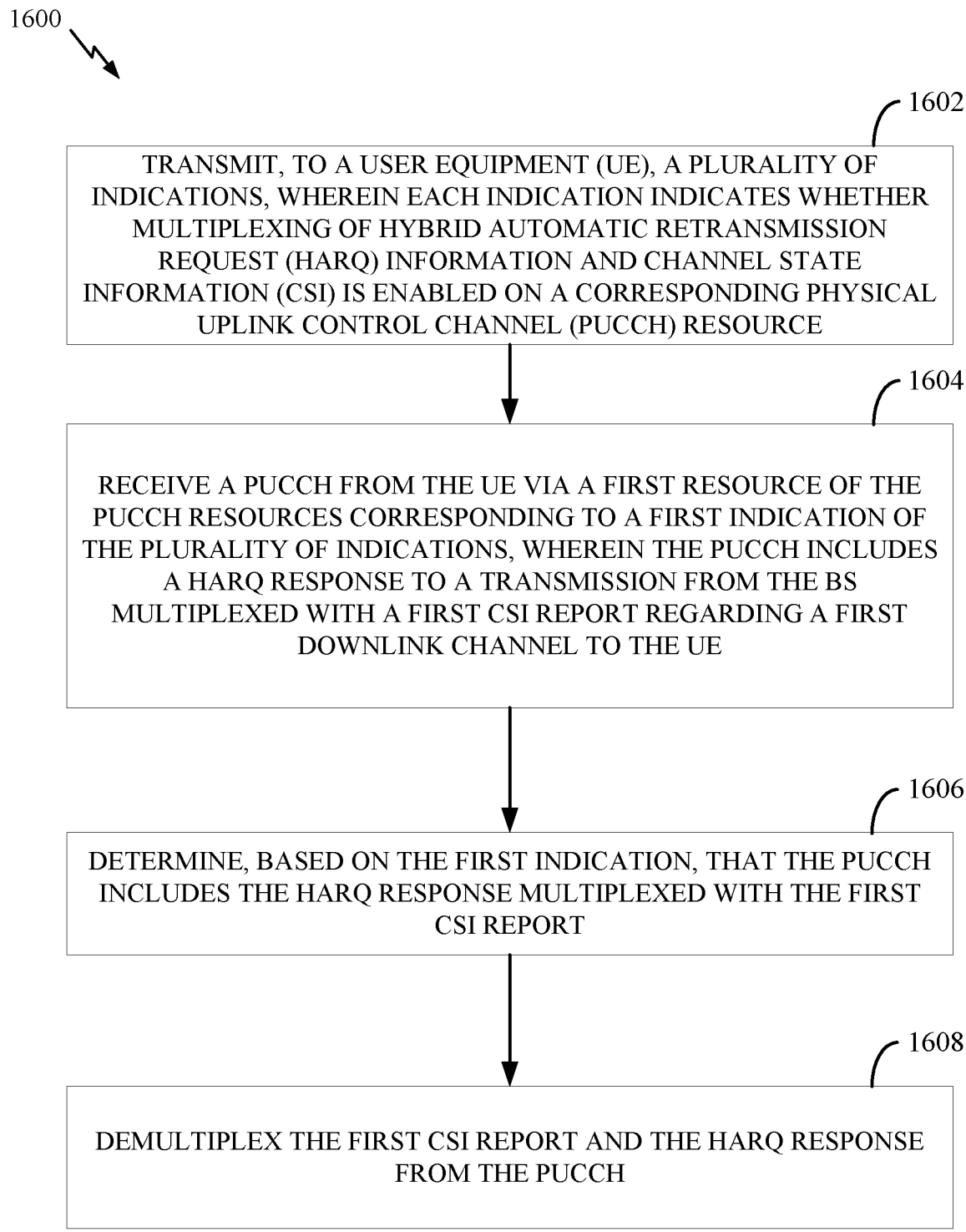
FIG. 16 is a flow diagram illustrating operations for wireless communications that may be performed by a BS to enable multiplexing of CSI and HARQ responses in a PUCCH, according to aspects of the present disclosure.

FIG. 16 is a flow diagram illustrating operations 1600 for wireless communications that may be performed by a BS (e.g., BS 110, shown in FIGS. 1 and 4) to enable multiplexing of CSI and HARQ responses in a PUCCH. Operations 1600 may be considered complementary to operations 1600, described above with reference to FIG. 16. At block 1602, operations 1600 begin with the BS transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource. Operations 1600 continue at block 1604 with the BS receiving a PUCCH from the UE via a first resource of the PUCCH resources corresponding to a first indication of the plurality of indications, wherein the PUCCH includes a HARQ response to a transmission from the BS multiplexed with a first CSI report regarding a first downlink channel to the UE. At block 1606, operations 1600 continue with the BS determining, based on the first indication, that the PUCCH includes the HARQ response multiplexed with the first CSI report. Operations 1600 continue at block 1608 with the BS demultiplexing the first CSI report and the HARQ response from the PUCCH.

According to aspects of the present disclosure, the PUCCH may include a scheduling request (SR) from the UE, and a BS performing operations 1600 may demultiplex the SR from the PUCCH.

In aspects of the present disclosure, the PUCCH may include a second CSI report regarding the first DL channel or a second DL channel to the UE, and a BS performing operations 1600 may demultiplex the second CSI report from the PUCCH.

According to aspects of the present disclosure, demultiplexing a HARQ response, CSI report, and/or SR from a PUCCH (e.g., as mentioned in block 1608 of operations 1600) may include: demodulating the PUCCH; decoding the PUCCH; and/or determining the HARQ response, the CSI report, and/or the SR.

In aspects of the present disclosure, the simultaneousHARQ-ACK-CSI flags for all PUCCH resources may be constrained (e.g., by a base station operating according to a network standard) to have the same value, i.e., all simultaneousHARQ-ACK-CSI flags are enabled or all are disabled. A BS operating in this manner may transmit signaling according to previously known techniques (i.e., according to previously known network standards), while preventing the previously described ambiguities regarding multiplexing of HARQ responses and CSI in PUCCH.

According to aspects of the present disclosure, a UE may determine the simultaneousHARQ-ACK-CSI flag for a PUCCH resource is enabled and, in response, determine that multiplexing of HARQ responses and CSI is enabled for all PUCCH resources. Similarly, a UE may determine the simultaneousHARQ-ACK-CSI flag for a PUCCH resource is disabled and, in response, determine that multiplexing of HARQ responses and CSI is disabled for all PUCCH resources.

Figure 17:
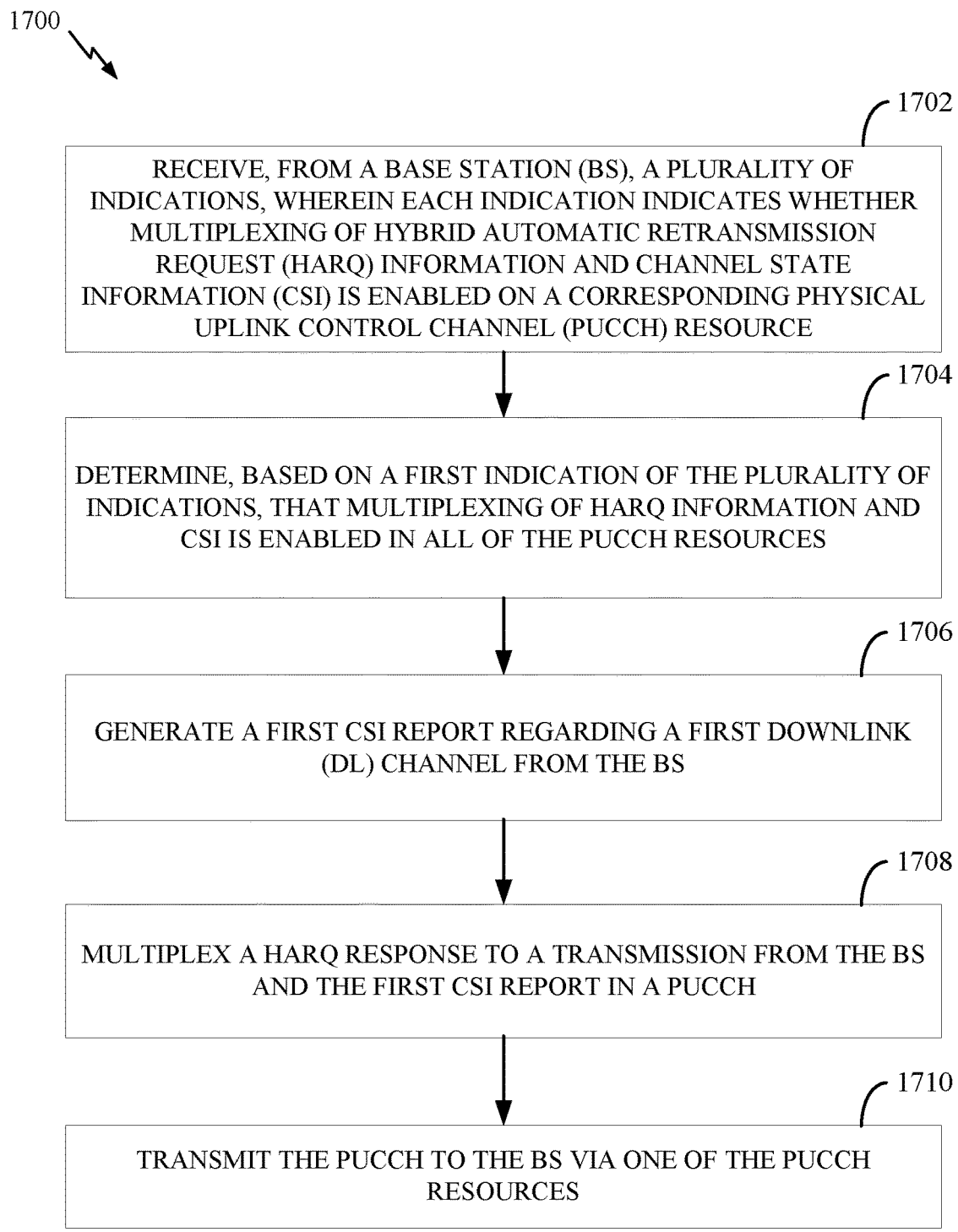
FIG. 17 is a flow diagram illustrating operations for wireless communications that may be performed by a UE to multiplex CSI and HARQ responses in a PUCCH, according to aspects of the present disclosure.

FIG. 17 is a flow diagram illustrating operations 1700 for wireless communications that may be performed by a UE (e.g., UE 120, shown in FIGS. 1 and 4), to multiplex CSI and HARQ responses in a PUCCH. At block 1702, operations 1700 begin with the UE receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource. Operations 1700 continue at block 1704 with the UE determining, based on a first indication of the plurality of indications, that multiplexing of HARQ information and CSI is enabled in all of the PUCCH resources. At block 1706, operations 1700 continue with the UE generating a first CSI report regarding a first downlink (DL) channel from the BS. Operations 1700 continue at block 1708 with the UE multiplexing a HARQ response to a transmission from the BS and the first CSI report in a PUCCH. At block 1710, operations 1700 continue with the UE transmitting the PUCCH to the BS via one of the PUCCH resources.

According to aspects of the present disclosure, a UE performing operations 1700 may multiplex the HARQ response, the first CSI report, and a scheduling request (SR) in the PUCCH in block 1708.

In aspects of the present disclosure, a UE performing operations 1700 may multiplex a second CSI report, regarding the first DL channel or a second DL channel from the BS, in the PUCCH with the HARQ response and the first CSI report.

Figure 18:
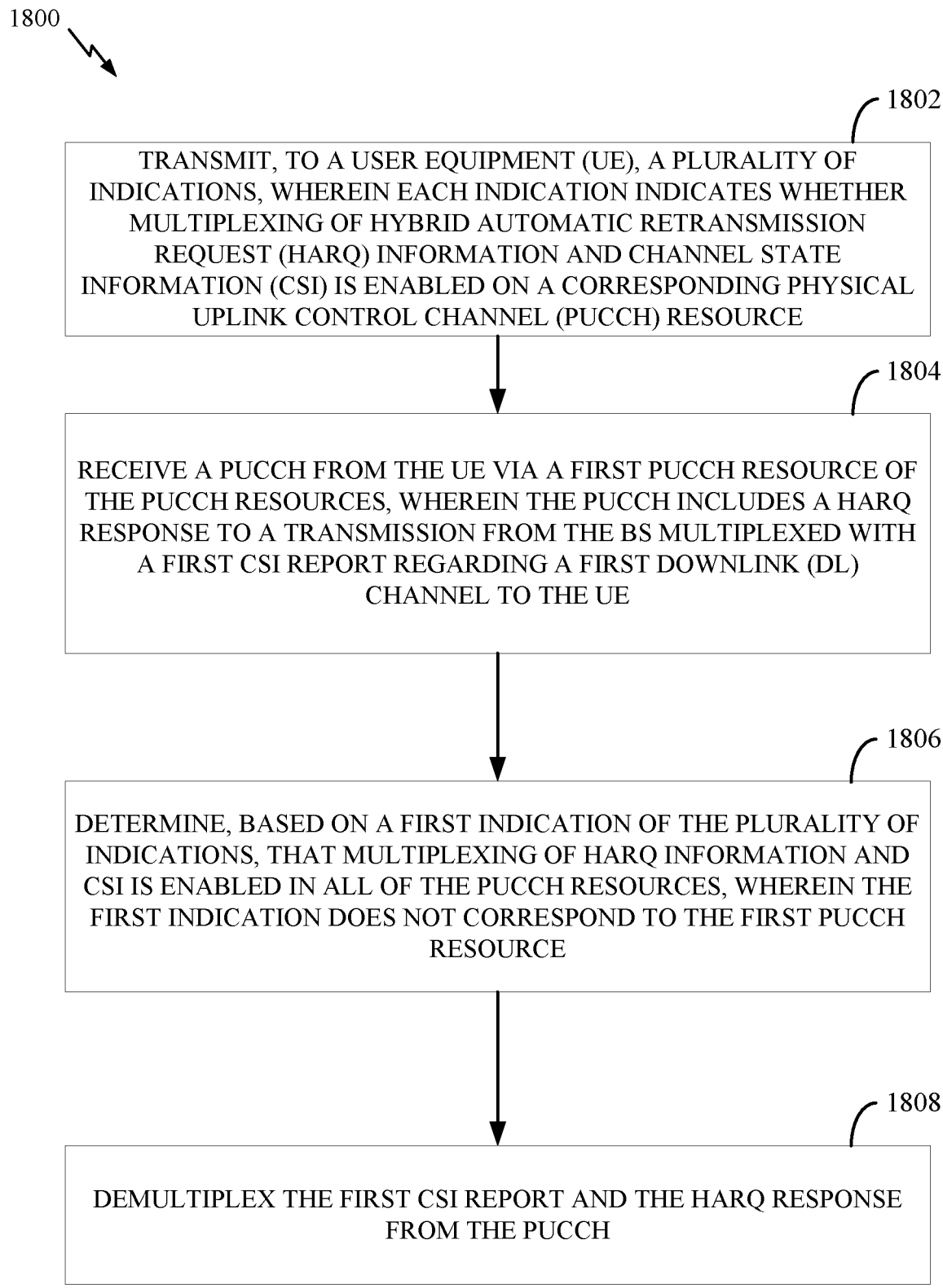
FIG. 18 is a flow diagram illustrating operations for wireless communications that may be performed by a BS to enable multiplexing of CSI and HARQ responses in a PUCCH, according to aspects of the present disclosure.

FIG. 18 is a flow diagram illustrating operations 1800 for wireless communications that may be performed by a BS (e.g., BS 110, shown in FIGS. 1 and 4) to enable multiplexing of CSI and HARQ responses in a PUCCH. Operations 1800 may be considered complementary to operations 1700, described above with reference to FIG. 17. At block 1802, operations 1800 begin with the BS transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource. Operations 1800 continue at block 1804 with the BS receiving a PUCCH from the UE via a first PUCCH resource of the PUCCH resources, wherein the PUCCH includes a HARQ response to a transmission from the BS multiplexed with a first CSI report regarding a first downlink (DL) channel to the UE. At block 1806, operations 1800 continue with the BS determining, based on a first indication of the plurality of indications, that multiplexing of HARQ information and CSI is enabled in all of the PUCCH resources, wherein the first indication does not correspond to the first PUCCH resource. Operations 1800 continue at block 1808 with the BS demultiplexing the first CSI report and the HARQ response from the PUCCH.

According to aspects of the present disclosure, the PUCCH may include a scheduling request (SR) from the UE, and a BS performing operations 1800 may demultiplex the SR from the PUCCH.

In aspects of the present disclosure, the PUCCH may include a second CSI report regarding the first DL channel or a second DL channel to the UE, and a BS performing operations 1800 may demultiplex the second CSI report from the PUCCH.

According to aspects of the present disclosure, demultiplexing a HARQ response, CSI report, and/or SR from a PUCCH (e.g., as mentioned in block 1808 of operations 1800) may include: demodulating the PUCCH; decoding the PUCCH; and/or determining the HARQ response, the CSI report, and/or the SR.

In aspects of the present disclosure, a BS (e.g., a gNB) may selectively configure the simultaneousHARQ-ACK-CSI flag differently for PUCCH-formats (which correspond to PUCCH resources, for example), with the condition that if the flag is enabled for a PUCCH-format with a smaller payload size, the flag is also set for all PUCCH-formats with a larger payload size than the PUCCH-format with the flag enabled. During the multiplexing process, a UE having a HARQ response(s) and a CSI report to transmit looks ahead and determines the format and simultaneousHARQ-ACK-CSI flag of a PUCCH resource to be used for transmitting multiplexed UCI. If the flag is true, then the UE continues to multiplex HARQ and CSI on the PUCCH resource. Otherwise, the UE drops the CSI and multiplexes only the rest of the UCI for transmission in a PUCCH on the PUCCH resource.

Figure 19A:
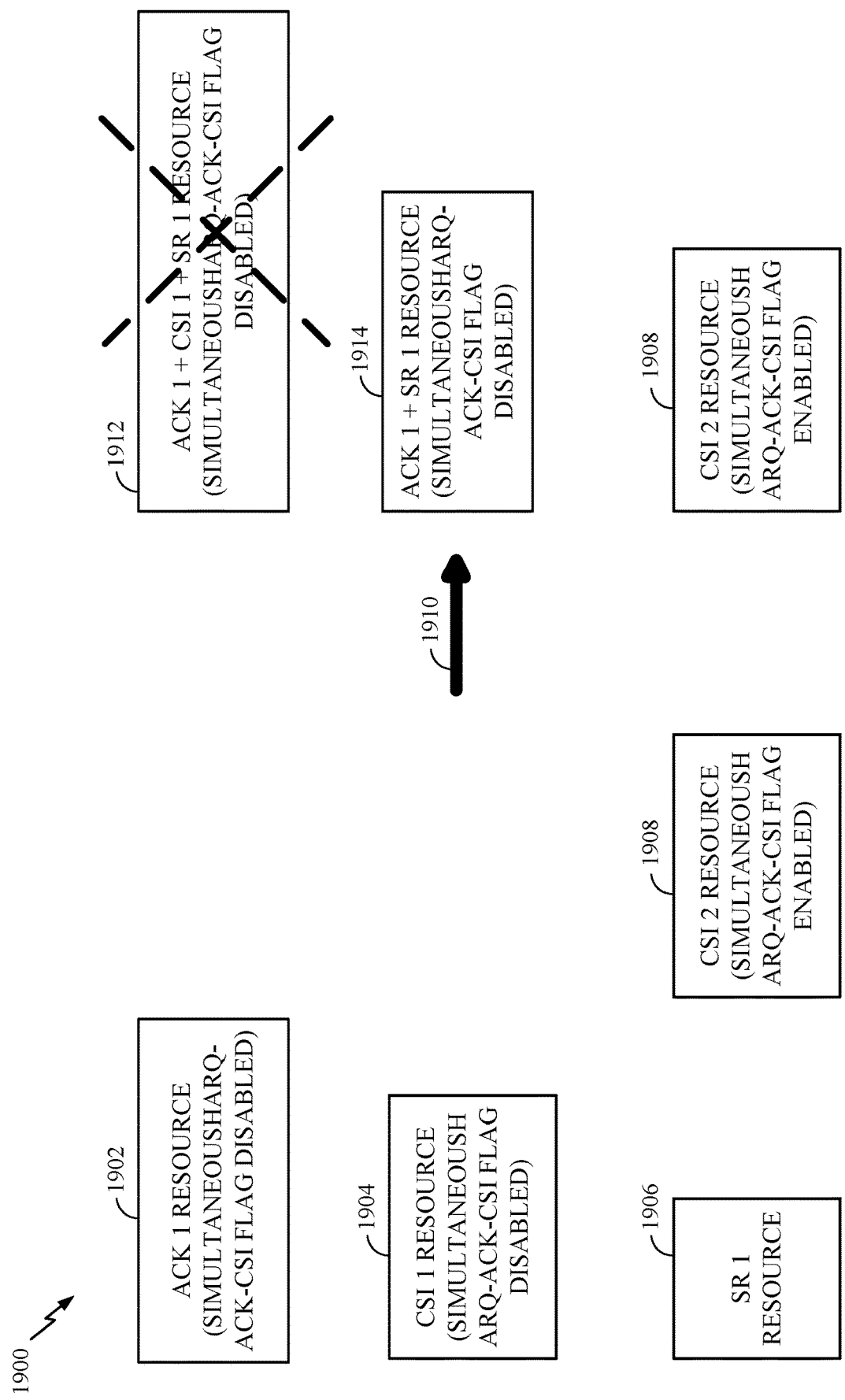
FIG. 19A is a time-frequency resource diagram illustrating a first loop of an iterative loop combining process in which a determined PUCCH resource does not allow for HARQ response and CSI multiplexing, according to aspects of the present disclosure.

FIG. 19A is a time-frequency resource diagram 1900 illustrating a first loop of an iterative loop combining process in which a determined PUCCH resource does not allow for HARQ response and CSI multiplexing. As illustrated, in the first loop of the iterative loop combining process, a UE has selected a first PUCCH resource for HARQ responses 1902 (i.e., an ACK 1 resource), a second PUCCH resource for a first CSI 1904 (i.e., a CSI 1 resource), a third PUCCH resource for an SR 1906 (i.e., an SR 1 resource) and a fourth PUCCH resource for a second CSI 1908 (i.e., a CSI 2 resource). As illustrated, the first PUCCH resource for HARQ responses 1902, the second PUCCH resource for a first CSI 1904, and the third PUCCH resource for SRs 1906 overlap in time, and the UE therefore looks ahead at a potential new PUCCH resource 1912 for transmitting multiplexed the HARQ responses, the first CSI, and the SRs. The UE determines that the new PUCCH resource 1912 (i.e., an ACK 1+CSI 1+SR 1 resource) does not contain the simultaneousHARQ-ACK-CSI flag (or the simultaneousHARQ-ACK-CSI flag for the PUCCH resource 1912 indicates multiplexing of HARQ responses and CSI is disabled) and therefore determines not to use the PUCCH resource 1912 for transmission of the HARQ responses, the first CSI, and the SRs, as symbolized by the dashed-line "X" over the PUCCH resource 1912. The UE determines to drop the first CSI and multiplexes the HARQ responses and SR at 1910. After multiplexing of the HARQ response and the SR, the UE at selects a new PUCCH resource 1914 (i.e., an ACK 1+SR 1 resource) for the HARQ responses and the SRs. The new PUCCH resource 1914 overlaps the fourth PUCCH resource for the second CSI 1908 in time, and the UE may determine that the second CSI should be multiplexed with the HARQ responses and the SR in a second loop, as described herein.

Figure 19B:
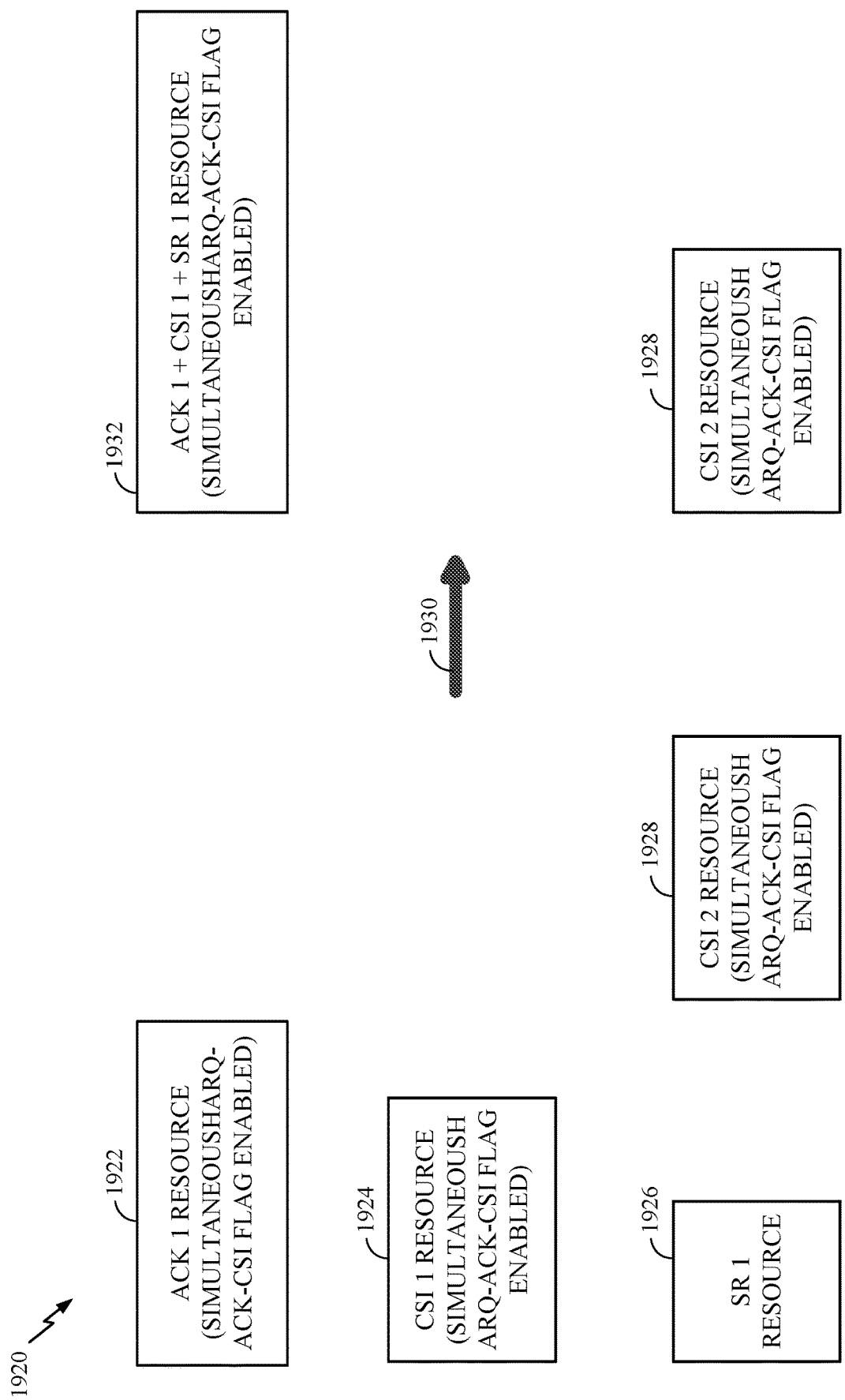
FIG. 19B is a time-frequency resource diagram illustrating a first loop of an iterative loop combining process in which a smaller PUCCH resource than determined PUCCH resource does allows for HARQ response and CSI multiplexing, according to aspects of the present disclosure.

FIG. 19B is a time-frequency resource diagram 1920 illustrating a first loop of an iterative loop combining process in which a smaller PUCCH resource than determined PUCCH resource does allows for HARQ response and CSI multiplexing. As illustrated, in the first loop of the iterative loop combining process, a UE has selected a first PUCCH resource for HARQ responses 1922 (i.e., an ACK 1 resource), a second PUCCH resource for a first CSI 1924 (i.e., a CSI 1 resource), a third PUCCH resource for an SR 1926 (i.e., an SR 1 resource) and a fourth PUCCH resource for a second CSI 1928 (i.e., a CSI 2 resource). As illustrated, the first PUCCH resource for HARQ responses 1922, the second PUCCH resource for a first CSI 1924, and the third PUCCH resource for SRs 1926 overlap in time, and the UE therefore looks ahead at a potential new PUCCH resource 1932 for transmitting multiplexed the HARQ responses, the first CSI, and the SRs. The UE determines that the new PUCCH resource 1932 (i.e., an ACK 1+CSI 1+SR 1 resource) has the simultaneousHARQ-ACK-CSI flag enabled, based on the PUCCH resource 1924, which has a smaller payload size than the PUCCH resource 1932, having the simultaneousHARQ-ACK-CSI flag enabled. The UE multiplexes the HARQ responses, the first CSI, and the SR at 1930. The new PUCCH resource 1932 overlaps the fourth PUCCH resource for the second CSI 1928 in time, and the UE may determine that the second CSI should be multiplexed with the HARQ responses, the first CSI, and the SR in a second loop, as described herein.

Figure 20:
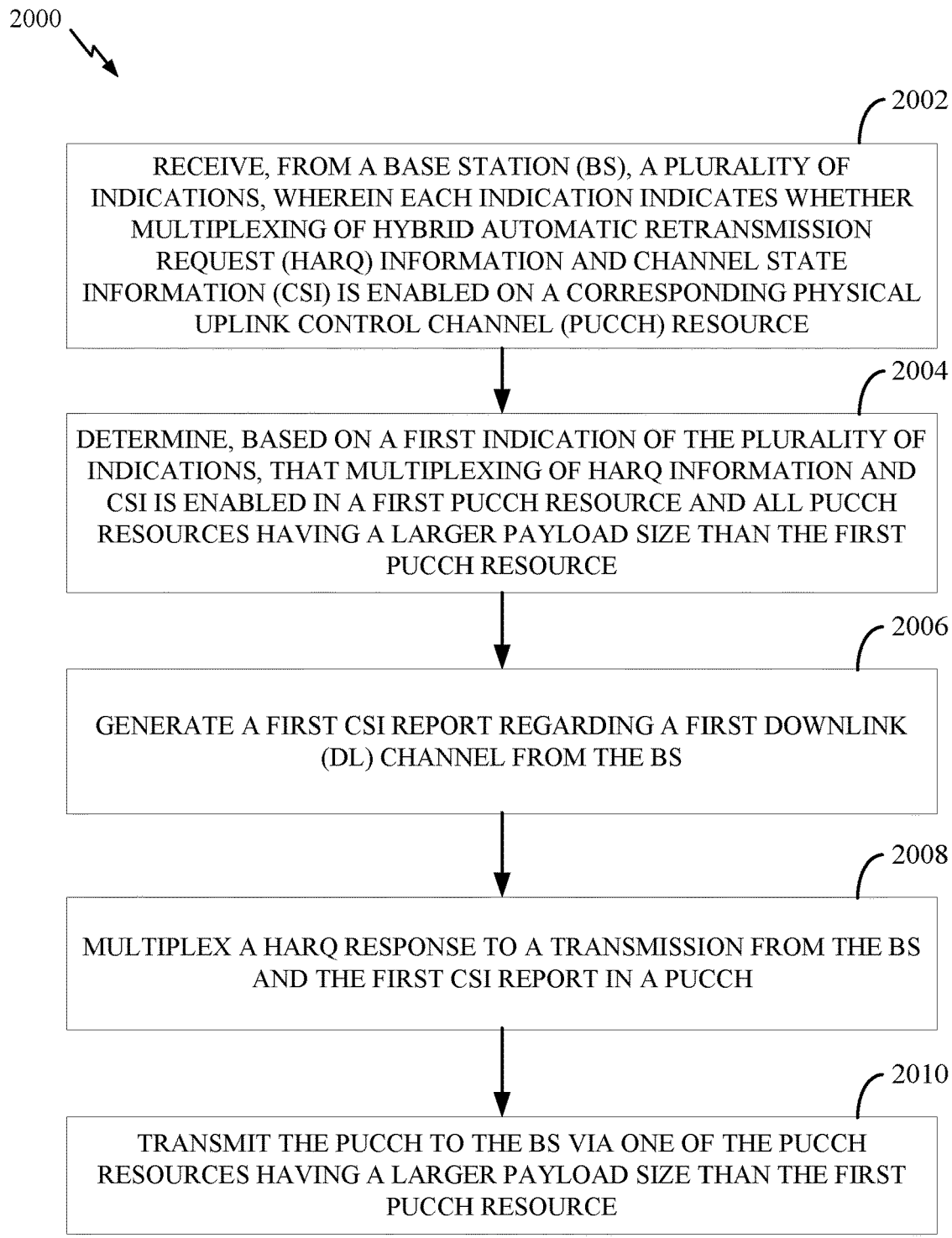
FIG. 20 is a flow diagram illustrating operations for wireless communications that may be performed by a UE to multiplex CSI and HARQ responses in a PUCCH, according to aspects of the present disclosure.

FIG. 20 is a flow diagram illustrating operations 2000 for wireless communications that may be performed by a UE (e.g., UE 120, shown in FIGS. 1 and 4), to multiplex CSI and HARQ responses in a PUCCH. At block 2002, operations 2000 begin with the UE receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource. Operations 2000 continue at block 2004 with the UE determining, based on a first indication of the plurality of indications, that multiplexing of HARQ information and CSI is enabled in a first PUCCH resource and all PUCCH resources having a larger payload size than the first PUCCH resource. At block 2006, operations 2000 continue with the UE generating a first CSI report regarding a first downlink (DL) channel from the BS. Operations 2000 continue at block 2008 with the UE multiplexing a HARQ response to a transmission from the BS and the first CSI report in a PUCCH. At block 2010, operations 2000 continue with the UE transmitting the PUCCH to the BS via one of the PUCCH resources having a larger payload size than the first PUCCH resource.

According to aspects of the present disclosure, a UE performing operations 2000 may multiplex the HARQ response, the first CSI report, and a scheduling request (SR) in the PUCCH in block 2008.

In aspects of the present disclosure, a UE performing operations 2000 may multiplex a second CSI report, regarding the first DL channel or a second DL channel from the BS, in the PUCCH with the HARQ response and the first CSI report.

Figure 21:
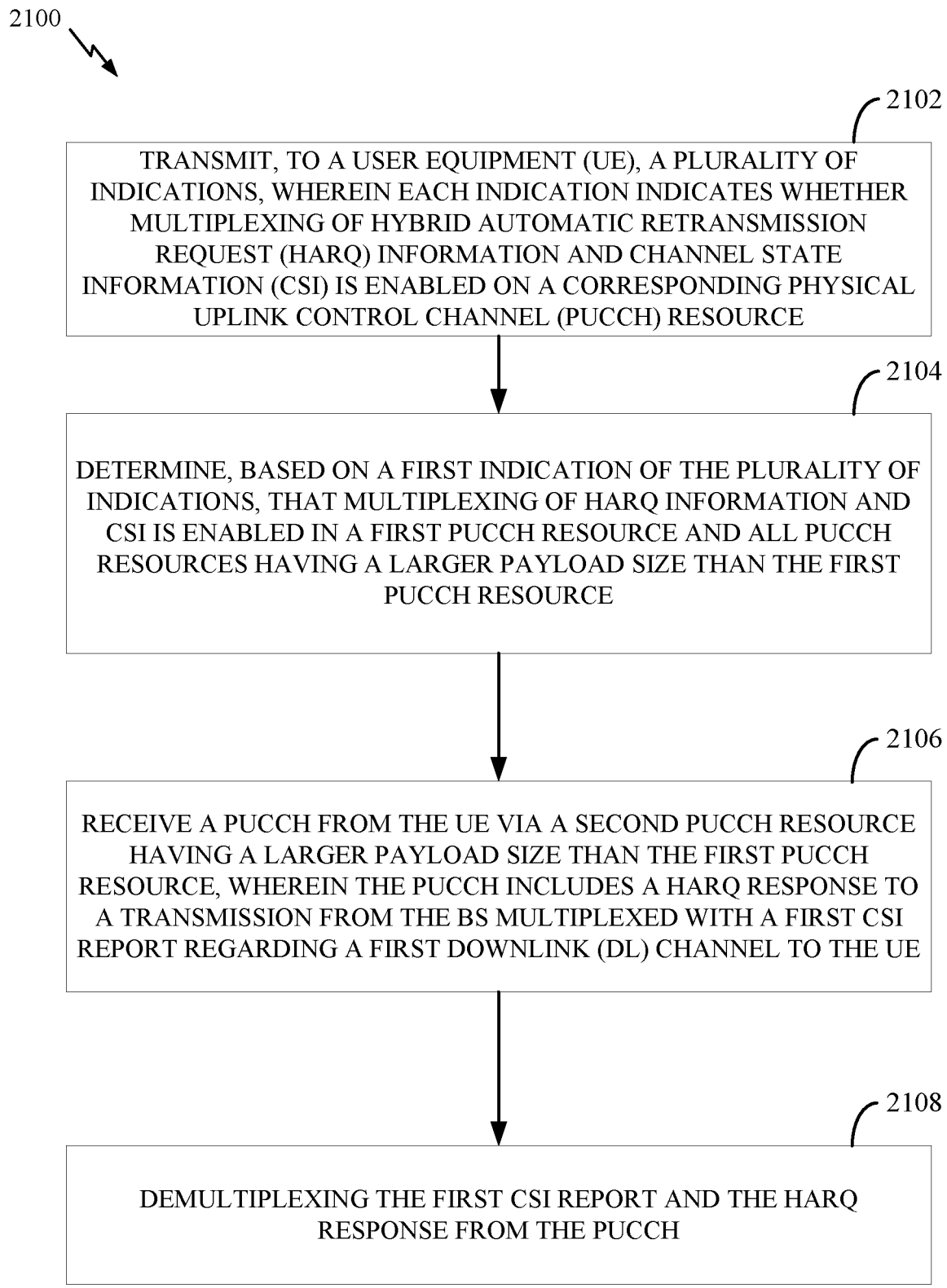
FIG. 21 is a flow diagram illustrating operations for wireless communications that may be performed by a BS to enable multiplexing of CSI and HARQ responses in a PUCCH, according to aspects of the present disclosure.

FIG. 21 is a flow diagram illustrating operations 2100 for wireless communications that may be performed by a BS (e.g., BS 110, shown in FIGS. 1 and 4) to enable multiplexing of CSI and HARQ responses in a PUCCH. Operations 2100 may be considered complementary to operations 2000, described above with reference to FIG. 20. At block 2102, operations 2100 begin with the BS transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource. Operations 2100 continue at block 2104 with the BS determining, based on a first indication of the plurality of indications, that multiplexing of HARQ information and CSI is enabled in a first PUCCH resource and all PUCCH resources having a larger payload size than the first PUCCH resource. At block 2106, operations 2100 continue with the BS receiving a PUCCH from the UE via a second PUCCH resource having a larger payload size than the first PUCCH resource, wherein the PUCCH includes a HARQ response to a transmission from the BS multiplexed with a first CSI report regarding a first downlink (DL) channel to the UE. Operations 2100 continue at block 2108 with the BS demultiplexing the first CSI report and the HARQ response from the PUCCH.

According to aspects of the present disclosure, the PUCCH may include a scheduling request (SR) from the UE, and a BS performing operations 2100 may demultiplex the SR from the PUCCH.

In aspects of the present disclosure, the PUCCH may include a second CSI report regarding the first DL channel or a second DL channel to the UE, and a BS performing operations 2100 may demultiplex the second CSI report from the PUCCH.

According to aspects of the present disclosure, demultiplexing a HARQ response, CSI report, and/or SR from a PUCCH (e.g., as mentioned in block 2108 of operations 2100) may include: demodulating the PUCCH; decoding the PUCCH; and/or determining the HARQ response, the CSI report, and/or the SR.

Example Communication Device

Figure 22:
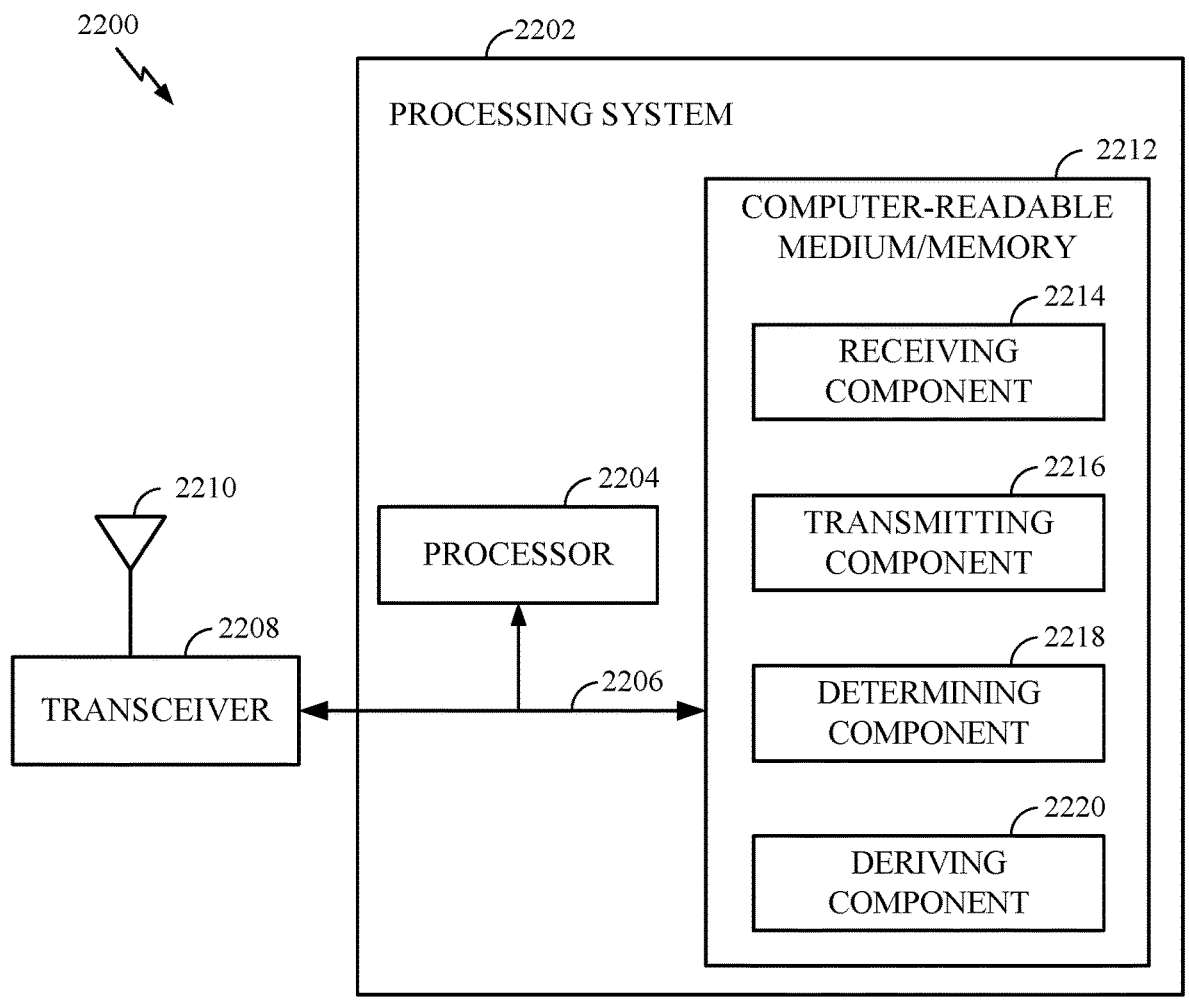
FIG. 22 illustrates a communications device that may include various components configured to perform operations for the techniques disclosed herein in accordance with aspects of the present disclosure.

FIG. 22 illustrates a communications device 2200 that may include various components (e.g., corresponding to means-plus-function components) configured to perform operations for the techniques disclosed herein, such as the operations illustrated in FIGS. 9, 10, 12, 13, 15-18, 20, and 21. The communications device 2200 includes a processing system 2202 coupled to a transceiver 2208. The transceiver 2208 is configured to transmit and receive signals for the communications device 2200 via an antenna 2210, such as the various signal described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions that when executed by processor 2204, cause the processor 2204 to perform the operations illustrated in FIGS. 9, 10, 12, 13, 15-18, 20, and 21, or other operations for performing the various techniques discussed herein.

In certain aspects, the processing system 1402 further includes a receiving component 2214 for performing the operations illustrated in FIGS. 9, 10, 12, 13, 15-18, 20, and 21. Additionally, the processing system 2202 includes a transmitting component 1416 for performing the operations illustrated in FIGS. 9, 10, 12, 13, 15-18, 20, and 21. Additionally, the processing system 2202 includes a determining component 2218 for performing the operations illustrated in FIGS. 9, 10, 12, 13, 15-18, 20, and 21. Additionally, the processing system 2202 includes a deriving component 2220 for performing the operations illustrated in FIGS. 9, 10, 12, 13, 15-18, 20, and 21. The receiving component 2214, transmitting component 2216, determining component 2218, and deriving component 2220 may be coupled to the processor 2204 via bus 2206. In certain aspects, the receiving component 2214, transmitting component 2216, determining component 2218, and deriving component 2220 may be hardware circuits. In certain aspects, the receiving component 2214, transmitting component 2216, determining component 2218, and deriving component 2220 may be software components that are executed and run on processor 2204.

EXAMPLE EMBODIMENTS

Embodiment 1

A method for wireless communications by a user equipment (UE), comprising receiving an indication from a base station (BS) that multiplexing of hybrid automatic retransmission request (HARQ) information and channel state information (CSI) is enabled in all physical uplink control channel (PUCCH) resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

Embodiment 2

The method of Embodiment 1, wherein the multiplexing comprises multiplexing the HARQ response, the first CSI report, and a scheduling request (SR) in the PUCCH.

Embodiment 3

The method of Embodiments 1 or 2, further comprising multiplexing a second CSI report, regarding the first DL channel or a second DL channel from the BS, in the PUCCH with the first CSI report and the HARQ response.

Embodiment 4

A method of wireless communications performed by a base station (BS), comprising transmitting an indication to a user equipment (UE) that multiplexing of hybrid automatic retransmission request (HARQ) information and channel state information (CSI) is enabled in all physical uplink control channel (PUCCH) resources; receiving a PUCCH from the UE via one of the PUCCH resources, wherein the PUCCH includes a HARQ response to a transmission from the BS multiplexed with a first CSI report regarding a first downlink (DL) channel to the UE; and demultiplexing the first CSI report and the HARQ response from the PUCCH.

Embodiment 5

The method of Embodiment 4, wherein the PUCCH includes a scheduling request (SR) from the UE, and the method further comprises demultiplexing the SR from the PUCCH.

Embodiment 6

The method of Embodiments 4 or 5, wherein the PUCCH includes a second CSI report regarding the first DL channel or a second DL channel to the UE, and the method further comprises demultiplexing the second CSI report from the PUCCH.

Embodiment 7

A method of wireless communications performed by a user equipment (UE), comprising receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; generating a first CSI report regarding a first downlink (DL) channel from the BS, wherein the first CSI report corresponds to a first PUCCH resource that corresponds to a first indication of the plurality of indications; obtaining a HARQ response to a transmission from the BS, wherein the HARQ response corresponds to a second PUCCH resource that corresponds to a second indication of the plurality of indications; determining, based on the first indication and the second indication to multiplex the HARQ response and the first CSI report in a PUCCH; multiplexing the HARQ response and the first CSI report in the PUCCH; and transmitting the PUCCH to the BS via a third PUCCH resource that corresponds to the PUCCH.

Embodiment 8

The method of Embodiment 7, wherein the determining is further based on a third indication corresponding to a fourth PUCCH resource that corresponds to a scheduling request (SR); and the multiplexing further comprises multiplexing the SR with the HARQ response and the first CSI report.

Embodiment 9

The method of Embodiments 7 or 8, wherein the determining is further based on a third indication corresponding to a fourth PUCCH resource that corresponds to a second CSI report regarding the first DL channel or a second DL channel from the BS; and the method further comprises multiplexing the second CSI report in the PUCCH with the first CSI report and the HARQ response.

Embodiment 10

A method of wireless communications performed by a base station (BS), comprising transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources, wherein the PUCCH includes a HARQ response to a transmission from the BS multiplexed with a first CSI report regarding a first downlink channel to the UE, wherein the first CSI report corresponds to a second PUCCH resource that corresponds to a first indication of the plurality of indications, and the HARQ response corresponds to a third PUCCH resource that corresponds to a second indication of the plurality of indications; determining, based on the first indication and the second indication, that the PUCCH includes the HARQ response multiplexed with the first CSI report; and demultiplexing the first CSI report and the HARQ response from the PUCCH.

Embodiment 11

The method of Embodiment 10, wherein the PUCCH includes a scheduling request (SR) from the UE; the determining is further based on a third indication corresponding to a fourth PUCCH resource that corresponds to a scheduling request (SR); and the method further comprises demultiplexing the SR from the PUCCH.

Embodiment 12

The method of Embodiments 10 or 11, wherein the PUCCH includes a second CSI report regarding the first DL channel or a second downlink channel to the UE; the determining is further based on a third indication corresponding to a fourth PUCCH resource that corresponds to the second CSI report; and the method further comprises demultiplexing the second CSI report from the PUCCH.

Embodiment 13

A method of wireless communications performed by a user equipment (UE), comprising receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; generating a first CSI report regarding a first downlink (DL) channel from the BS; obtaining a HARQ response to a transmission from the BS; multiplexing the HARQ response and the first CSI report in a PUCCH, wherein the PUCCH corresponds to a first PUCCH resource that corresponds to a first indication of the plurality of indications; determining based on the first indication to not drop the first CSI report in the PUCCH; and transmitting the PUCCH to the BS via a first PUCCH resource.

Embodiment 14

The method of Embodiment 13, wherein the multiplexing further comprises multiplexing a scheduling request (SR) with the HARQ response and the first CSI report.

Embodiment 15

The method of Embodiments 13 or 14, further comprising multiplexing a second CSI report, regarding the first DL channel or a second DL channel from the BS, in the PUCCH with the first CSI report and the HARQ response.

Embodiment 16

A method of wireless communications performed by a base station (BS), comprising transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receiving a PUCCH from the UE via a first resource of the PUCCH resources corresponding to a first indication of the plurality of indications, wherein the PUCCH includes a HARQ response to a transmission from the BS multiplexed with a first CSI report regarding a first downlink channel to the UE; determining, based on the first indication, that the PUCCH includes the HARQ response multiplexed with the first CSI report; and demultiplexing the first CSI report and the HARQ response from the PUCCH.

Embodiment 17

The method of Embodiment 16, wherein the PUCCH includes a scheduling request (SR) from the UE, and the method further comprises demultiplexing the SR from the PUCCH.

Embodiment 18

The method of Embodiment 16, wherein the PUCCH includes a second CSI report regarding the first DL channel or a second downlink channel to the UE; and the method further comprises demultiplexing the second CSI report from the PUCCH.

Embodiment 19

A method of wireless communications performed by a user equipment (UE), comprising receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in all of the PUCCH resources; generating a first CSI report regarding a first downlink (DL) channel from the BS; multiplexing a HARQ response to a transmission from the BS and the first CSI report in a PUCCH; and transmitting the PUCCH to the BS via one of the PUCCH resources.

Embodiment 20

The method of Embodiment 19, wherein the multiplexing comprises: multiplexing the HARQ response, the first CSI report, and a scheduling request (SR) in the PUCCH.

Embodiment 21

The method of Embodiments 19 or 20, further comprising multiplexing a second CSI report, regarding the first DL channel or a second DL channel from the BS, in the PUCCH with the first CSI report and the HARQ response.

Embodiment 22

A method of wireless communications performed by a base station (BS), comprising transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; receiving a PUCCH from the UE via a first PUCCH resource of the PUCCH resources, wherein the PUCCH includes a HARQ response to a transmission from the BS multiplexed with a first CSI report regarding a first downlink (DL) channel to the UE; determining, based on a first indication of the plurality of indications, that multiplexing of HARQ information and CSI is enabled in all of the PUCCH resources, wherein the first indication does not correspond to the first PUCCH resource; and demultiplexing the first CSI report and the HARQ response from the PUCCH.

Embodiment 23

The method of Embodiment 22, wherein the PUCCH includes a scheduling request (SR) from the UE, and the method further comprises demultiplexing the SR from the PUCCH.

Embodiment 24

The method of Embodiments 22 or 23, wherein the PUCCH includes a second CSI report regarding the first DL channel or a second DL channel to the UE, and the method further comprises demultiplexing the second CSI report from the PUCCH.

Embodiment 25

A method of wireless communications performed by a user equipment (UE), comprising receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; generating a first CSI report regarding a first downlink (DL) channel from the BS; multiplexing a HARQ response to a transmission from the BS and the first CSI report in a PUCCH; and transmitting the PUCCH to the BS via one of the PUCCH resources having a larger payload size than the first PUCCH resource.

Embodiment 26

The method of Embodiment 25, wherein the multiplexing comprises multiplexing the HARQ response, the first CSI report, and a scheduling request (SR) in the PUCCH.

Embodiment 27

The method of Embodiments 25 or 26, further comprising multiplexing a second CSI report, regarding the first DL channel or a second DL channel from the BS, in the PUCCH with the first CSI report and the HARQ response.

Embodiment 28

A method of wireless communications performed by a base station (BS), comprising transmitting, to a user equipment (UE), a plurality of indications, wherein each indication indicates whether multiplexing of hybrid automatic retransmission request (HARQ) information and channel state information (CSI) is enabled on a corresponding physical uplink control channel (PUCCH) resource; determining, based on a first indication of the plurality of indications, that multiplexing of HARQ information and CSI is enabled in a first PUCCH resource and all PUCCH resources having a larger payload size than the first PUCCH resource; receiving a PUCCH from the UE via a second PUCCH resource having a larger payload size than the first PUCCH resource, wherein the PUCCH includes a HARQ response to a transmission from the BS multiplexed with a first CSI report regarding a first downlink (DL) channel to the UE; and demultiplexing the first CSI report and the HARQ response from the PUCCH.

Embodiment 29

The method of Embodiment 28, wherein the PUCCH includes a scheduling request (SR) from the UE, and the method further comprises demultiplexing the SR from the PUCCH.

Embodiment 30

The method of Embodiments 28 or 29, wherein the PUCCH includes a second CSI report regarding the first DL channel or a second DL channel to the UE, and the method further comprises demultiplexing the second CSI report from the PUCCH.

Embodiment 31

The method of Embodiment 13, wherein the first CSI report corresponds to a second PUCCH resource that corresponds to a second indication of the plurality of indications and wherein the HARQ response corresponds to a third PUCCH resource that corresponds to a third indication of the plurality of indications, and the method further comprises: determining, based on the second indication and the third indication to multiplex the HARQ response and the first CSI report in the PUCCH.

Embodiment 32

The method of Embodiment 31, wherein the determining to multiplex the HARQ response and the first CSI repot in the PUCCH is further based on a fourth indication corresponding to a fourth PUCCH resource that corresponds to a scheduling request (SR); and the multiplexing further comprises multiplexing the SR with the HARQ response and the first CSI report.

Embodiment 33

The method of Embodiments 31 or 32, wherein the determining to multiplex the HARQ response and the first CSI repot in the PUCCH is further based on a fourth indication corresponding to a fourth PUCCH resource that corresponds to a second CSI report regarding the first DL channel or a second DL channel from the BS; and the method further comprises: multiplexing the second CSI report in the PUCCH with the first CSI report and the HARQ response.

Embodiment 34

The method of any of claim 1, 2, or 3 wherein the indication comprises signaling indicating that a simultaneousHARQ-ACK-CSI flag applies to all PUCCHs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The preceding description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9, 10, 12, 13, 15, and 16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications performed by a user equipment (UE), comprising:
    receiving an indication from a base station (BS) that multiplexing of hybrid automatic retransmission request (HARQ) information and channel state information (CSI) is enabled in all physical uplink control channel (PUCCH) resource formats in a slot based on the multiplexing of the HARQ information and the CSI being enabled in at least one PUCCH resource format in the slot in accordance with the indication;
    generating a first CSI report regarding a first downlink (DL) channel from the BS;
    multiplexing a HARQ response to a transmission from the BS and the first CSI report in a PUCCH; and
    transmitting the PUCCH to the BS via one of the PUCCH resource formats.

2. The method of claim 1, wherein the multiplexing comprises:
    multiplexing the HARQ response, the first CSI report, and a scheduling request (SR) in the PUCCH.

3. The method of claim 1, further comprising:
    multiplexing a second CSI report, regarding the first DL channel or a second DL channel from the BS, in the PUCCH with the first CSI report and the HARQ response.

4. The method of claim 1, wherein the indication comprises signaling indicating that a simultaneous HARQ-ACK-CSI flag applies to all PUCCHs.

5. A method of wireless communications performed by a user equipment (UE), comprising:
- receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource format, and wherein one or more indications of the plurality of indications indicates that multiplexing of the HARQ information and the CSI is enabled in all PUCCH resource formats in a slot based on the multiplexing of the HARQ information and the CSI being enabled in at least one selected PUCCH resource format in the slot in accordance with the one or more indications;
- generating a first CSI report regarding a first downlink (DL) channel from the BS;
- obtaining a HARQ response to a transmission from the BS;
- multiplexing the HARQ response and the first CSI report in a PUCCH, wherein the PUCCH corresponds to a first PUCCH resource format that corresponds to a first indication of the one or more indications;
- determining based on the first indication to not drop the first CSI report in the PUCCH; and
- transmitting the PUCCH to the BS via the first PUCCH resource format of the PUCCH resource formats.

6. The method of claim 5, wherein:
- the multiplexing further comprises multiplexing a scheduling request (SR) with the HARQ response and the first CSI report.

7. The method of claim 5, further comprising:
- multiplexing a second CSI report, regarding the first DL channel or a second DL channel from the BS, in the PUCCH with the first CSI report and the HARQ response.

8. The method of claim 5, wherein the first CSI report corresponds to a second PUCCH resource format that corresponds to a second indication of the plurality of indications and wherein the HARQ response corresponds to a third PUCCH resource format that corresponds to a third indication of the plurality of indications, and the method further comprises:
- determining, based on the second indication and the third indication to multiplex the HARQ response and the first CSI report in the PUCCH.

9. The method of claim 8, wherein:
- the determining to multiplex the HARQ response and the first CSI report in the PUCCH is further based on a fourth indication corresponding to a fourth PUCCH resource format that corresponds to a scheduling request (SR); and
- the multiplexing further comprises multiplexing the SR with the HARQ response and the first CSI report.

10. The method of claim 8, wherein:
- the determining to multiplex the HARQ response and the first CSI report in the PUCCH is further based on a fourth indication corresponding to a fourth PUCCH resource format that corresponds to a second CSI report regarding the first DL channel or a second DL channel from the BS; and the method further comprises:
- multiplexing the second CSI report in the PUCCH with the first CSI report and the HARQ response.

11. A method of wireless communications performed by a user equipment (UE), comprising:
- receiving, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource format;
- determining, based on a first indication of the plurality of indications, that multiplexing of the HARQ information and the CSI is enabled in all PUCCH resource formats in a slot based on the multiplexing of the HARQ information and the CSI being enabled in at least one PUCCH resource format in the slot in accordance with the first indication;
- generating a first CSI report regarding a first downlink (DL) channel from the BS;
- multiplexing a HARQ response to a transmission from the BS and the first CSI report in a PUCCH; and
- transmitting the PUCCH to the BS via one of the PUCCH resource formats.

12. The method of claim 11, wherein the multiplexing comprises:
- multiplexing the HARQ response, the first CSI report, and a scheduling request (SR) in the PUCCH.

13. The method of claim 11, further comprising:
- multiplexing a second CSI report, regarding the first DL channel or a second DL channel from the BS, in the PUCCH with the first CSI report and the HARQ response.

14. A user equipment (UE), comprising:
- memory comprising instructions; and
- one or more processors configured to execute the instructions and cause the UE to:
  - receive, from a base station (BS), a plurality of indications, wherein each indication indicates whether multiplexing of hybrid automatic retransmission request (HARQ) information and channel state information (CSI) is enabled on a corresponding physical uplink control channel (PUCCH) resource format;
  - determine, based on a first indication of the plurality of indications, that multiplexing of the HARQ information and the CSI is enabled in all PUCCH resource formats in a slot based on the multiplexing of the HARQ information and the CSI being enabled in at least one PUCCH resource format in the slot in accordance with the first indication;
  - generate a first CSI report regarding a first downlink (DL) channel from the BS;
  - multiplex a HARQ response to a transmission from the BS and the first CSI report in a PUCCH; and
  - transmit the PUCCH to the BS via one of the PUCCH resource formats.

15. The apparatus of claim 14, wherein the one or more processors are further configured to execute the instructions and cause the UE to:
- multiplex the HARQ response, the first CSI report, and a scheduling request (SR) in the PUCCH.

16. The apparatus of claim 14, wherein the one or more processors are further configured to execute the instructions and cause the UE to:
- multiplex a second CSI report, regarding the first DL channel or a second DL channel from the BS, in the PUCCH with the first CSI report and the HARQ response.

* * * * *